(12) United States Patent
Lee

(10) Patent No.: US 12,075,174 B2
(45) Date of Patent: *Aug. 27, 2024

(54) PROCESSING CIRCUITRY FOR PROCESSING DATA FROM SENSOR INCLUDING ABNORMAL PIXELS

(71) Applicant: Samsung Electronics Co., Ltd., Suwon-si (KR)

(72) Inventor: Wonseok Lee, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/894,750

(22) Filed: Aug. 24, 2022

(65) Prior Publication Data

US 2022/0408041 A1 Dec. 22, 2022

Related U.S. Application Data

(63) Continuation of application No. 16/590,896, filed on Oct. 2, 2019, now Pat. No. 11,445,136.

(30) Foreign Application Priority Data

Feb. 12, 2019 (KR) .................. 10-2019-0016286

(51) Int. Cl.
*H04N 25/683* (2023.01)
(52) U.S. Cl.
CPC .............................. *H04N 25/683* (2023.01)

(58) Field of Classification Search
CPC ........ H04N 23/51; H04N 23/55; H04N 23/56; H04N 23/57; G01N 21/8483
See application file for complete search history.

(56) References Cited

U.S. PATENT DOCUMENTS

| 5,521,639 | A | * | 5/1996 | Tomura | H04N 25/68 348/E5.081 |
|---|---|---|---|---|---|
| 6,115,077 | A | | 9/2000 | Tsukagoshi | |
| 7,916,191 | B2 | | 3/2011 | Kiba et al. | |
| 9,860,429 | B1 | | 1/2018 | Silverstein et al. | |
| 2013/0194638 | A1 | * | 8/2013 | Kuno | H04N 1/0087 358/406 |
| 2015/0281539 | A1 | * | 10/2015 | Ueki | H04N 19/13 348/298 |

(Continued)

FOREIGN PATENT DOCUMENTS

| JP | 4453332 B2 | 4/2010 |
|---|---|---|
| KR | 10-0794232 B1 | 1/2008 |

(Continued)

*Primary Examiner* — Yogesh K Aggarwal
(74) *Attorney, Agent, or Firm* — Harness, Dickey & Pierce, P.L.C.

(57) ABSTRACT

Processing circuitry may be configured to detect an abnormal pixel among a plurality of pixels based on pixel values of the plurality of pixels and one or more reference pixel values corresponding to the plurality of values; generate first encoded data by encoding pixel data of the plurality of pixels based on the pixel values with a first encoder; generate second encoded data by encoding the pixel data based on remaining pixels of the plurality of pixels excluding the detected abnormal pixel with a second encoder; and output the first encoded data or the second encoded data based on detecting the abnormal pixel.

20 Claims, 15 Drawing Sheets

(56) References Cited

U.S. PATENT DOCUMENTS

2016/0198158 A1* 7/2016 Wige .................. H04N 19/533
                                                           375/240.16

FOREIGN PATENT DOCUMENTS

| KR | 10-0809603 B1 | 3/2008 |
| KR | 10-0906606 B1 | 7/2009 |
| KR | 10-2011-0079317 A | 7/2011 |
| KR | 10-2019-0137260 | 12/2019 |

* cited by examiner

FIG. 13

| 211h | 212h | 213h | 214h |
|---|---|---|---|
| B:16 | G:100 (Reference pixel value(90)+ reference value(10)) | B:24 | G:96 |

PROCESSING CIRCUITRY FOR PROCESSING DATA FROM SENSOR INCLUDING ABNORMAL PIXELS

CROSS-REFERENCE TO RELATED APPLICATIONS

This is a continuation of U.S. application Ser. No. 16/590,896, filed Oct. 2, 2019, which claims priority to Korean Patent Application No. 10-2019-0016286 filed on Feb. 12, 2019, in the Korean Intellectual Property Office, the disclosures of which are incorporated by reference herein in their entireties.

BACKGROUND

Some example embodiments of some inventive concepts disclosed herein relate to processing circuitry, and more particularly, relate to processing circuitry for processing data from sensors.

Electronic devices having an image photographing function are widely used. An electronic device (hereinafter referred to as a "photographing device") having the image photographing function may be a smartphone, a tablet personal computer (PC), a portable multimedia player (PMP), a laptop PC, a wearable device, etc. Additionally, other types of devices may utilize still and/or motion imaging capabilities, such as videocameras, document scanners, three-dimensional object scanners, and light detection and ranging ("LIDAR") devices. Images captured by such devices may be utilized in a variety of applications, such as media recording, object detection and modeling, and biometrics.

The photographing device photographs an external environment and/or a subject by using a sensor. The photographing device processes image data obtained through photographing. An image is displayed in a display panel, based on the processed image data.

As semiconductor technology develops, users desire high-definition images. However, in the case where some components of the photographing device are faulty for process reasons or where an image includes defective data due to an external environment, the quality of image may decrease.

SUMMARY

Some example embodiments of some inventive concepts include a processing circuitry for processing data including abnormal data. In some example embodiments, the processing circuitry may encode data by using different methods depending on whether data include abnormal information.

According to some example embodiments, a processing circuitry may be configured to detect an abnormal pixel among a plurality of pixels based on pixel values of the plurality of pixels and one or more reference pixel values of one or more reference pixels corresponding to the plurality of pixels. The processing circuitry may be configured to generate first encoded data by encoding pixel data of the plurality of pixels based on the pixel values with a first encoder. The processing circuitry may be configured to generate second encoded data by encoding the pixel data based on remaining pixels of the plurality of pixels excluding the detected abnormal pixel with a second encoder. The selecting circuitry may be configured to output the first encoded data or the second encoded data based on detecting the abnormal pixel.

According to some example embodiments, the processing circuitry may be configured to, when a first determined value based on a first pixel value of a first pixel of a first plurality of pixels and a first reference pixel value of a first reference pixel corresponding to the first pixel is greater than a reference value, encode first pixel data for the first plurality of pixels in a first way to generate first encoded data including first data associated with the first pixel, encode the first pixel data in a second way that is different than the first way to generate second encoded data that does not include the first data, and to select one encoded data of the first encoded data and the second encoded data based on pixel values of the first plurality of pixels, when the first determined value being greater than the reference value.

According to some example embodiments, a processing circuitry may be configured to store first data indicating a reference pixel value and second data indicating a reference value. The processing circuitry is configured to reconstruct a first pixel value of the first pixel based on the first data and the second data, based on first encoded data that is generated by encoding with a first encoder first pixel data for a first plurality of pixels including a first pixel. The determined value based on the first pixel value and the reference pixel value is greater than the reference value.

BRIEF DESCRIPTION OF THE FIGURES

The above and other objects and features of some inventive concepts will become apparent by describing in detail some example embodiments thereof with reference to the accompanying drawings.

FIG. 13 is a conceptual diagram of an example of second reconstruction values according to some example embodiments.

DETAILED DESCRIPTION

Below, some example embodiments of some inventive concepts may be described in detail and clearly to such an extent that an ordinary one in the art easily implements some inventive concepts.

Figure 1:
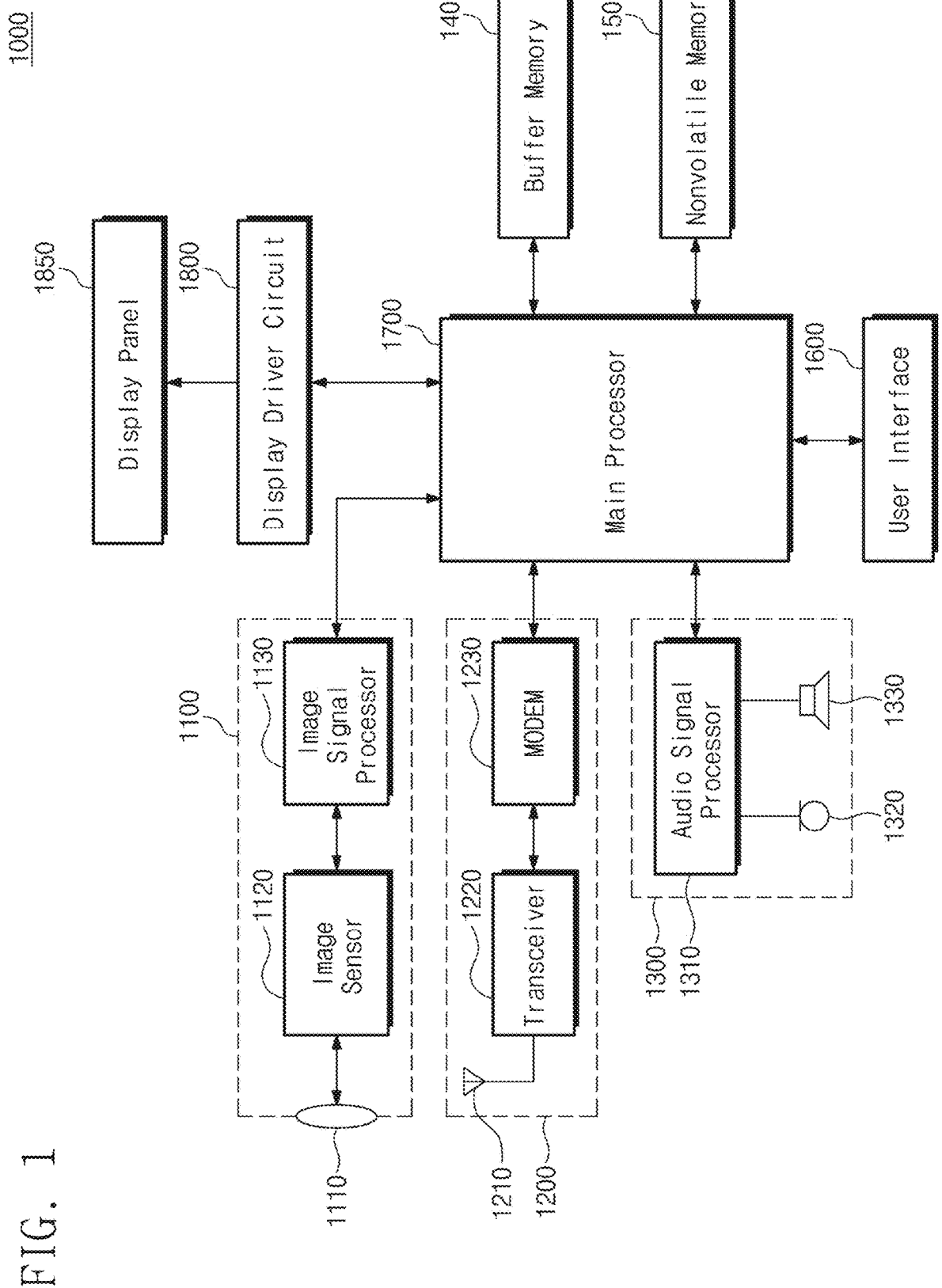
FIG. 1 is a block diagram illustrating an example configuration of an electronic device including an image processing function according to some example embodiments.

FIG. 1 is a block diagram illustrating an example configuration of an electronic device including an image processing function according to some example embodiments of some inventive concepts. For example, an electronic device 1000 may be implemented with one of various types of electronic devices such as a smartphone, a tablet PC, a laptop PC, an e-book reader, an MP3 player, a wearable device, etc.

The electronic device 1000 may include various electronic circuits. For example, the electronic circuits of the electronic device 1000 may include an image processing block 1100, a communication block 1200, an audio processing block 1300, a buffer memory 1400, a nonvolatile memory 1500, a user interface 1600, a main processor 1700, a display driver circuit 1800, and a display panel 1850.

The image processing block 1100 may be configured to receive a light through a lens 1110. An image sensor 1120 and an image signal processor 1130 included in the image processing block 1100 may be configured to generate image data associated with an external object, based on the received light.

The image sensor 1120 may be configured to output an electrical signal based on the received light. The image sensor 1120 may include pixels. A part of the pixels may be abnormal pixels. The image signal processor 1130 according to some example embodiments of some inventive concepts may be configured to determine whether a signal is output from an abnormal pixel. The image signal processor 1130 according to some example embodiments of some inventive concepts may be configured to generate image data by using a method that is differently determined according to a determination result. The abnormal pixel will be described with reference to FIG. 3.

The communication block 1200 may be configured to exchange signals with an external device/system through an antenna 1210. A transceiver 1220 and a MODEM (Modulator/Demodulator) 1230 of the communication block 1200 may be configured to process signals, which may be exchanged with the external device/system, in compliance with various wireless communication protocols.

The audio processing block 1300 may be configured to process sound information by using an audio signal processor 1310, thus playing and outputting the audio. The audio processing block 1300 may be configured to receive an audio input through a microphone 1320. The audio processing block 1300 may be configured to output the played audio through a speaker 1330.

The buffer memory 1400 may be configured to store data that are used for an operation of the electronic device 1000. For example, the buffer memory 1400 may be configured to temporarily store data processed or to be processed by the main processor 1700. For example, the buffer memory 1400 may include a volatile memory such as a static random access memory (SRAM), a dynamic RAM (DRAM), or a synchronous DRAM (SDRAM), and/or a nonvolatile memory such as a phase-change RAM (PRAM), a magneto-resistive RAM (MRAM), a resistive RAM (ReRAM), or a ferroelectric RAM (FRAM).

The nonvolatile memory 1500 may be configured to store data regardless of power supply. For example, the nonvolatile memory 1500 may include at least one of various nonvolatile memories such as a flash memory, a PRAM, an MRAM, a ReRAM, and a FRAM. For example, the nonvolatile memory 1500 may include a removable memory such as a secure digital (SD) card, and/or an embedded memory such as an embedded multimedia card (eMMC).

The user interface 1600 may be configured to arbitrate communication between a user and the electronic device 1000. For example, the user interface 1600 may include input interfaces such as a keypad, a button, a touch screen, a touch pad, a gyroscope sensor, a vibration sensor, and an acceleration sensor. For example, the user interface 1600 may include output interfaces such as a motor and a LED lamp.

The main processor 1700 may be configured to control overall operations of the components of the electronic device 1000. The main processor 1700 may be configured to process various operations, which may enable or promote operation of the electronic device 1000. For example, the main processor 1700 may be implemented with an operation processing device/circuit, which includes one or more processor cores, such as a general-purpose processor, a special-purpose processor, an application processor, or a microprocessor.

For example, the main processor 1700 may include the image signal processor 1130 or may have a function of the image signal processor 1130. In this case, the main processor 1700 may be configured to generate image data by using a signal received from the image signal processor 1100. As described with regard to the image signal processor 1130, the main processor 1700 according to some example embodiments of some inventive concepts may be configured to determine whether a signal is output from an abnormal pixel. The main processor 1700 according to some example embodiments of some inventive concepts may be configured to generate image data by using a method that is differently determined according to a determination result.

The display driver circuit 1800 may be configured to receive image data from the main processor 1700. The display driver circuit 1800 may be configured to drive the display panel 1850 based on the received image data. The display panel 1850 may be configured to display an image based on the received data. In the case where image data generated by the image signal processor 1130 and/or the main processor 1700 according to some example embodiments of some inventive concepts are used, image distortion and/or image degradation that occurs in an image may decrease.

The example illustrated in FIG. 1 is provided for better understanding, and is not intended to limit some inventive concepts. The electronic device 1000 may not include one or more of the components illustrated in FIG. 1; additionally or alternatively, the electronic device 1000 may further include at least one component not illustrated in FIG. 1.

Figure 7:
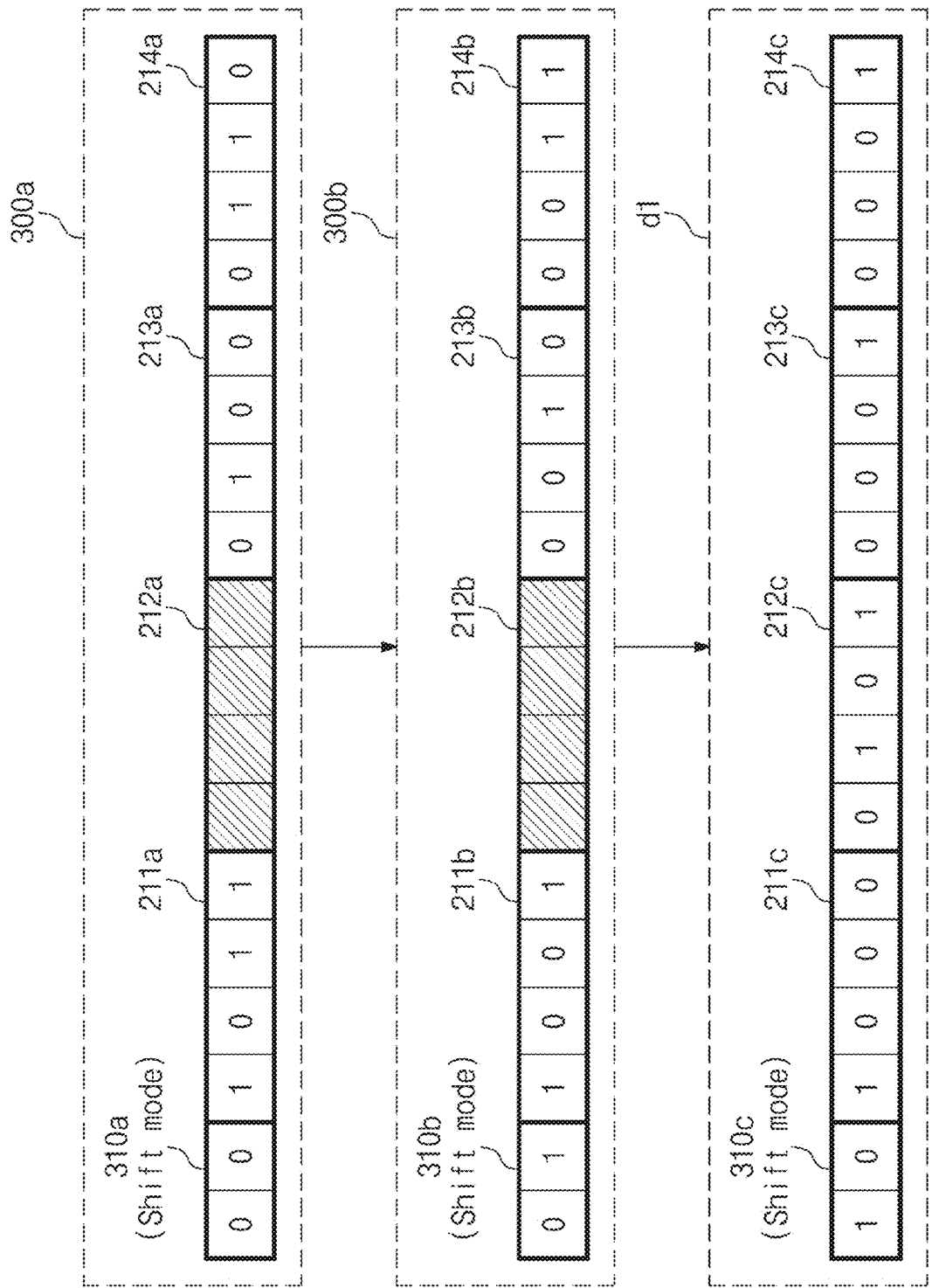
FIG. 7 is a conceptual diagram of an example of a first way in which an encoder may encode a signal according to some example embodiments.
Figure 8:
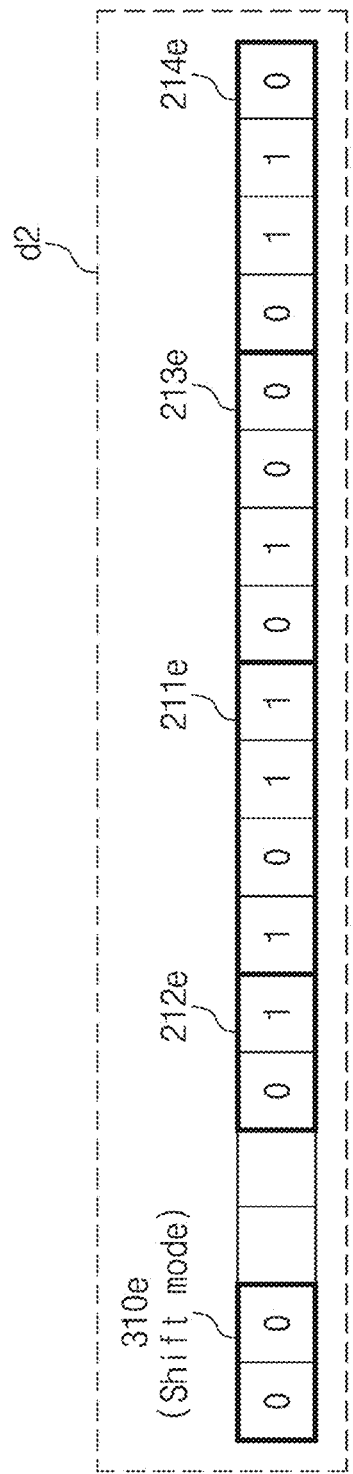
FIG. 8 is a conceptual diagram for describing a second way in which an encoder may encode a signal according to some example embodiments.

In devices such as shown in FIG. 1, data for an image may include one or more pixels with pixel values that are abnormal, e.g., pixel values that are abnormally high or low. In some cases, encoding the image as an encoded sequence of pixels may not be able to include the abnormal value of the pixel, for example, where the value of the abnormal pixel is not within a value range defined by a fixed bit width of each pixel. Some ways of encoding the pixel may include the abnormal value of the pixel, but may cause data to be lost and/or may expand the size of the encoded data. Instead, in some example embodiments, when a plurality of pixels is determined to include an abnormal pixel, a portion of the plurality of pixels, including the abnormal pixel, may be encoded as a first encoded data in a first way by a first encoder (for example, as shown in FIG. 7), and a remaining portion of the plurality of pixels, excluding the abnormal pixel, may be encoded as a second encoded data in a second way by a second encoder (for example, as shown in FIG. 8). The encoded data for the plurality of pixels that is based on the first encoded data and the second encoded data may be more highly compressed than other encoded data that is not based on the first encoded data and the second encoded data, where such more highly compressed data may reduce consumption of memory and/or may be processed or transferred more quickly than less compressed data. Alternatively or additionally, such encoding may include more information (e.g., may reduce a loss of information) from the pixel values of the plurality of pixels than other encoded data that is not based on the first encoded data and the second encoded data.

Figure 2:
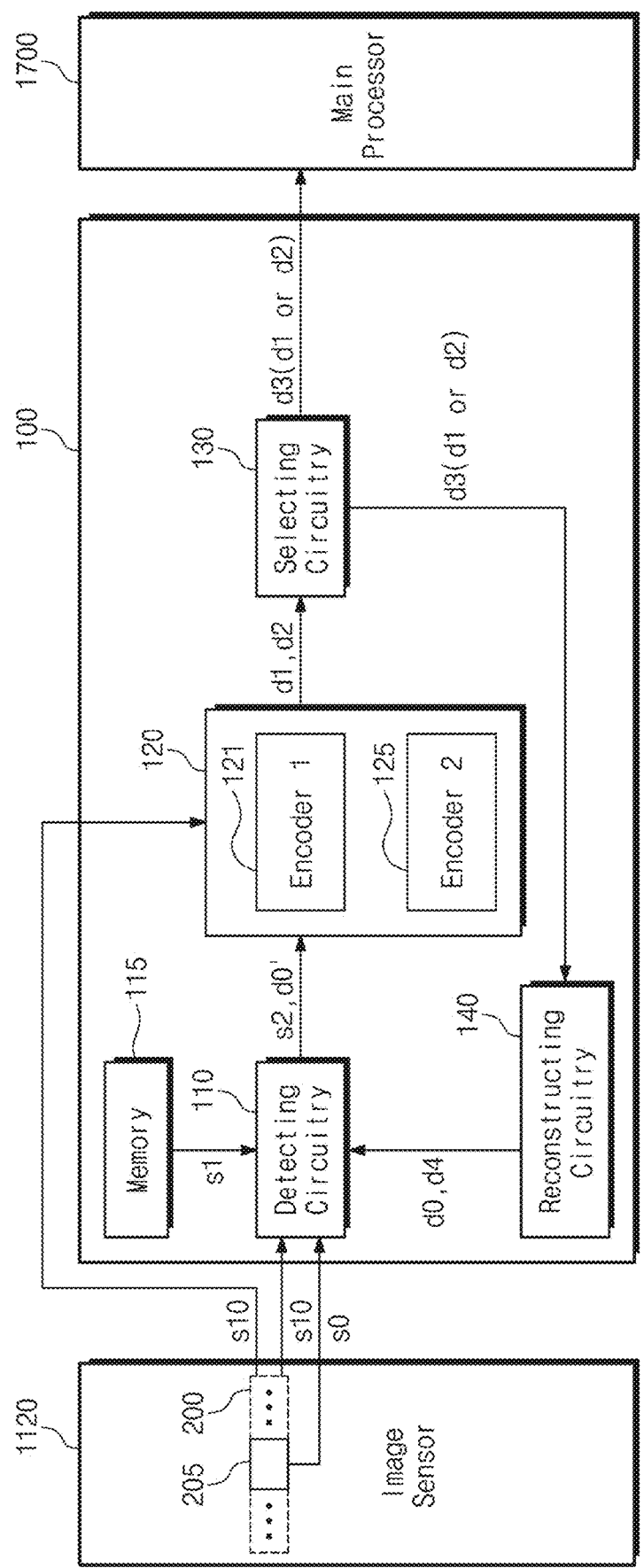
FIG. 2 is a block diagram illustrating an example configuration of processing circuitry according to some example embodiments.

FIG. 2 is a block diagram of an example configuration of processing circuitry according to some example embodiments. It is to be appreciated that FIG. 2 presents only an example organization of components and processing circuitry, and that some example embodiments may include a different organization of components and/or processing circuitry. For example, names used in some example embodiments and in FIG. 2, such as "detecting circuitry," "selecting circuitry," and "reconstructing circuitry," are used only for convenience and not to suggest that such operations are to be performed by distinct units with corresponding names. Rather, other example embodiments may include a different organization, such as renaming, rearranging, adding, partitioning, duplicating, merging, and/or removing components, sets of components and/or relationships thereamong, without departing from the scope of the present disclosure. All such variations that are reasonably technically and logically possible, and that are not contradictory with other statements, are intended to be included in this disclosure, the scope of which is to be understood as being limited only by the claims.

In some example embodiments, components of the processing circuitry 100 may be implemented with a hardware circuit (e.g., an analog circuit or a logic circuit). For example, operations of the components of processing circuitry 100 to be described below may be implemented with a program code of software and/or firmware, and operations to be described below may be implemented as one or more processors (e.g., the main processor 1700) executes instructions of the program code. Additionally, in processing circuitry including multiple components, respective components may be similar (e.g., two components that include hardware processors) or different (e.g., a first component including a hardware processor and a second component including software).

Referring to FIG. 2, processing circuitry 100 may include a detecting circuitry 110, a memory 115, an encoder 120, selecting circuitry 130, and reconstructing circuitry 140. As described with reference to FIG. 1, the processing circuitry 100 may be included in the image signal processor 1130 or the main processor 1700. However, some example embodiments of some inventive concepts may not be not limited thereto. For example, the processing circuitry 100 may be included in an encoder that processes signals received from various devices. And the memory 115 may not be included in the processing circuitry 100 and the memory 115 may be external to the processing circuitry 100.

The image sensor 1120 may include pixels. The pixels may be configured to receive a light from the outside. A pixel 205 may be configured to receive a light from the outside. The image sensor 1120 may be configured to generate a signal s0 based on the light incident on the pixel 205. The signal s0 may be configured to include information about the amount of light incident on the pixel 205. In the following descriptions, a value that is obtained by digitizing information included in the signal s0 is referred to as a "pixel value" of the pixel 205.

In some example embodiments such as FIG. 2, the detecting circuitry 110 may be configured to receive the signal s0 from the image sensor 1120. The detecting circuitry 110 may be configured to determine whether the pixel 205 is an abnormal pixel, based on the signal s0. For example, the detecting circuitry 110 may be configured to determine whether the pixel 205 is an abnormal pixel, based on the pixel value that the signal s0 indicates. The detecting circuitry 110 may be configured to evaluate the pixel value of the pixel 205 and a reference pixel value of a reference pixel. The reference pixel may be one of pixels around the pixel 205. The detecting circuitry 110 may be configured to receive data d0 from the reconstructing circuitry 140. The data d0 may include information about pixel values. However, the pixel values that the data d0 indicate may be reconstructed pixel values. The detecting circuitry 110 may be configured to select the reference pixel based on the data d0 and the signal s0. The detecting circuitry 110 may be configured to output data d0'. The data d0' may include information about the selected reference pixel. The data d0 and d0' and the reference pixel will be described with reference to FIG. 3.

In some example embodiments such as FIG. 2, the detecting circuitry 110 may be configured to generate a determined value based on the pixel value of the pixel 205 and the reference pixel value. In some example embodiments, the determined value may be a difference between the pixel value of the pixel 205 and the reference pixel value. However, in some other example embodiments, the determined value may be generated and/or evaluated in other ways, such as a ratio of the pixel value of the pixel 205 to the reference pixel value, a vector distance between vector representations of the pixel value of the pixel 205 and the reference pixel value, or a statistical measurement such as standard deviation. Similarly, evaluating the determined value may include, for example, calculating and/or evaluating a difference, a ratio, etc. When the determined value is greater than the reference value, the detecting circuitry 110 may be configured to determine that the pixel 205 is an abnormal pixel. In this case, the abnormal pixel may mean an edge pixel, a hot pixel, a cold pixel, etc. The edge pixel may be a pixel in an area, which is marked by a boundary line, of an image. The hot pixel may be a pixel that reacts to a light more sensitively than any other pixels. The cold pixel may be a pixel that reacts to a light more insensitively than any other pixels. That is, the edge pixel, the hot pixel, and the cold pixel may have pixel values that are different from pixel values of surrounding pixels. For another example, the detecting circuitry 110 may be configured to detect an abnormal pixel, based on a signal s1 received from the memory 115. In this case, the abnormal pixel may mean a bad pixel. The bad pixel may mean a pixel that is abnormally manufactured for process reasons. A position of the bad pixel may be fixed. A signal that is output from the bad pixel may not indicate a pixel value. Also, the signal output from the bad pixel may indicate the same pixel value regardless of the amount of light incident on the bad pixel.

In some example embodiments such as FIG. 2, the memory 115 may be configured to include information about a position of a bad pixel. The memory 115 may be configured to output the signal s1 to the detecting circuitry 110. The signal s1 may include information about a position of a bad pixel. Based on the signal s1, the detecting circuitry 110 may be configured to determine whether the pixel 205 is an abnormal pixel, without consideration of the pixel value of the pixel 205. In detail, when a position that the signal s1 indicates is the same as the position of the pixel 205, the detecting circuitry 110 may be configured to determine that the pixel 205 is an abnormal pixel. However, some example embodiments of some inventive concepts may not be limited thereto. For example, the detecting circuitry 110 may be configured to detect a bad pixel based on a pixel value that the signal s0 indicates. Also, the detecting circuitry 110 may be configured to detect the edge pixel, the hot pixel, and the cold pixel, based on the signal s1.

In the following descriptions, it is assumed that the processing circuitry 100 is configured to generate image data in the unit of a line pixel. Pixels may be classified in the unit of a line pixel. A line pixel 200 may be a set of pixels arranged in a line. The line pixel 200 will be described with reference to FIG. 3. The detecting circuitry 110 may be configured to receive a signal s10. The signal s10 may be a set of signals that are output from pixels included in the line pixel 200. The signal s10 may include data associated with pixel values of the pixels included in the line pixel 200.

In some example embodiments such as FIG. 2, the detecting circuitry 110 may be configured to determine whether each of the pixels included in the line pixel 200 is an abnormal pixel, based on the signal s10. That is, the detecting circuitry 110 may be configured to detect whether the line pixel 200 includes an abnormal pixel, based on the signal s10. The detecting circuitry 110 may be configured to output a signal s2 based on whether the line pixel 200 includes an abnormal pixel. The signal s2 may have a logical value that is differently determined according to whether the line pixel 200 includes an abnormal pixel. In the following descriptions, the detecting circuitry 110 may be configured to output the signal s2 having a value of logic 1 when the line pixel 200 includes an abnormal pixel. Also, the detecting circuitry 110 may be configured to output the signal s2 having a value of logic 0 when the line pixel 200 does not include an abnormal pixel. However, some example embodiments of some inventive concepts may not be limited thereto. For example, the signal s2 may be a signal having a voltage level that is differently determined according to a detection result.

In some example embodiments such as FIG. 2, the encoder 120 may be configured to receive the signals s2 and s10 and the data d0'. The signal s2 may indicate whether the line pixel 200 includes an abnormal pixel. The signal s10 may include data associated with pixel values of the pixels included in the line pixel 200. The data d0' may include data associated with a reference pixel value of a reference pixel. The encoder 120 may be configured to encode data of pixels in the unit of the line pixel 200. That is, the encoder 120 may be configured to encode data included in the signal s10 based on the signal s2 and the data d0'. In the following descriptions, encoding a signal means encoding data included in a signal. For example, encoding the signal s10 means encoding data that are included in the signal s10 with regard to pixels included in the line pixel 200. The encoder 120 may include a first encoder 121 and a second encoder 125. The first encoder 121 may be configured to encode the signal s10 in a first way regardless of a logical value of the signal s2. Depending on a logical value of the signal s2, the second encoder 125 may be configured not to encode the signal s10 or to encode the signal s10 in a second way. For example, in the case where the signal s2 has a value of logic 0, the first encoder 121 may be configured to encode the signal s10 in the first way, and the second encoder 125 may be configured not to encode the signal s10. That is, in the case where the signal s2 has a value of logic 0, the second encoder 125 may be configured not to operate. In the case where the signal s2 has a value of logic 1, the first encoder 121 may be configured to encode the signal s10 in the first way, and the second encoder 125 may be configured to encode the signal s10 in the second way. The first encoder 121 may be configured to encode the signal s10 to output data d1. The second encoder 125 may be configured to encode the signal s10 to output data d2. Operations of the first encoder 121 and the second encoder 125 will be described with reference to FIGS. 3, 7, and 8.

In some example embodiments such as FIG. 2, the selecting circuitry 130 may be configured to receive the data d1 and the data d2. The selecting circuitry 130 may be configured to select one of the data d1 and the data d2. In detail, the selecting circuitry 130 may be configured to decode the data d1 in a third way. The third way may be a way to decode the data d1 that are encoded in the first way. The selecting circuitry 130 may be configured to decode the data d2 in a fourth way. The fourth way may be a way to decode the data d2 that are encoded in the second way. The selecting circuitry 130 may be configured to select one of the data d1 and the data d2, based on the decoded data. The selecting circuitry 130 may be configured to output selected data d3 to the main processor 1700 and/or the reconstructing circuitry 140. Also, the selecting circuitry 130 may be configured to output a result of decoding the selected data d3 to the reconstructing circuitry 140.

In some example embodiments such as FIG. 2, the reconstructing circuitry 140 may be configured to receive the data d3. The reconstructing circuitry 140 may be configured to decode the data d3 for the purpose of obtaining a pixel value of the pixel 205. When the data d3 are the data d1, the reconstructing circuitry 140 may be configured to decode the data d3 in a fifth way. The fifth way may be similar to the third way. When the data d3 are the data d2, the reconstructing circuitry 140 may be configured to decode the data d3 in a sixth way. The sixth way may be similar to the fourth way. In the following descriptions, a pixel value of the pixel 205 that is obtained by the reconstructing circuitry 140 through decoding is referred to as a "reconstruction value." Data included in the signal s10 may be lost while the signal s10 is encoded and/or decoded. Accordingly, a difference may be present between the reconstruction value and the pixel value. The reconstructing circuitry 140 may be configured to output data d4 to the detecting circuitry 110. The data d4 may include information about the reconstruction value of the pixel 205. However, some example embodiments of some inventive concepts may not be limited thereto. For example, a decoding operation that is performed by the reconstructing circuitry 140 may instead be performed by the selecting circuitry 130. The selecting circuitry 130 may be configured to output the result of decoding the selected data d3 to the reconstructing circuitry 140. In this case, the reconstructing circuitry 140 may be configured not to perform a separate decoding operation. The data d4 may be generated based on a result of decoding the data d3.

In the example of FIG. 2 and as generally referred to herein, processing circuitry (including components thereof, such as detecting circuitry 110, selecting circuitry 130, and/or reconstructing circuitry 140) may include hardware such as logic circuits; a hardware/software combination, such as a processor executing software; or a combination thereof. For example, a processor may include, but is not limited to, a central processing unit (CPU), a graphics processing unit (GPU), an arithmetic logic unit (ALU), a digital signal processor, a microcomputer, a field programmable gate array (FPGA), a System-on-Chip (SoC), a programmable logic unit, a microprocessor, an application-specific integrated circuit (ASIC), etc.

Figure 3:
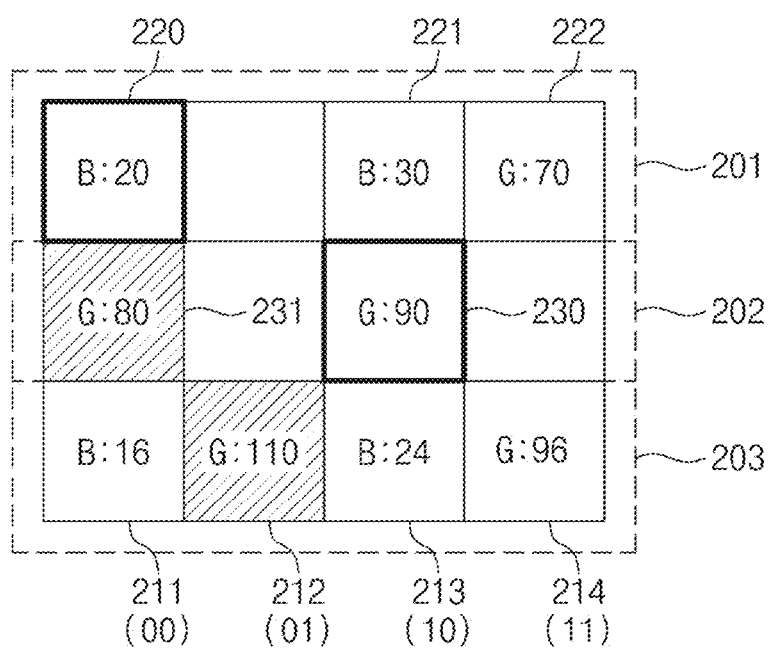
FIG. 3 is a conceptual diagram of an example of an operation of detecting circuitry of FIG. 2 according to some example embodiments.

FIG. 3 is a conceptual diagram for describing an operation of a detecting circuitry of FIG. 2 according to some example embodiments. For better understanding, FIGS. 2 and 3 will be referenced together. For example, pixels that are arranged in the image sensor 1120 are illustrated in FIG. 3. In the following descriptions, it is assumed that the image sensor 1120 is an RGB sensor, but some example embodiments of some inventive concepts may not be limited thereto. For example, the image sensor 1120 may include one color channel (such as a monochromatic image sensor) or sensors for a different set of wavelengths, such as cyan, magenta, and yellow (CMY), and/or may include non-visible wavelengths, such as near infrared, far infrared, and/or ultraviolet.

In some example embodiments such as FIG. 3, pixels 220, 221, 222, 230, 231, 211, 212, 213, and 214 may be classified in the unit of a line pixel. As described with reference to FIG. 2, a line pixel may be a set of pixels arranged in a line. A line pixel 201 may be a set of the pixels 220, 221, and 222. A line pixel 202 may be a set of the pixels 230 and 231. A line pixel 203 may be a set of the pixels 211, 212, 213, and 214. In the following descriptions, a signal for a line pixel means a set of signals for pixels included in the line pixel. Also, a signal for a pixel means a signal that is generated based on a light incident on the pixel. The line pixels 201, 202, and 203 may be arranged from the top to the bottom. The image sensor 1120 may be configured to output a signal for the line pixel 201 prior to a signal for the line pixel 202. Also, the image sensor 1120 may be configured to output the signal for the line pixel 202 prior to a signal for the line pixel 203. Accordingly, in the processing circuitry 100, the signal for the line pixel 202 may be processed after the signal for the line pixel 201 is processed. Also, in the processing circuitry 100, the signal for the line pixel 203 may be processed after the signal for the line pixel 202 is processed.

In some example embodiments such as FIG. 3, before the detecting circuitry 110 determines whether the line pixel 203 includes an abnormal pixel, the reconstructing circuitry 140 may be configured to obtain reconstruction values of the pixels 220, 221, 222, 231, and 230. The pixels 220, 221, 222, 231, and 230 may be pixels included in the line pixels 201 and 202. The reconstructing circuitry 140 may be configured to output the data d0. The data d0 may include information about the reconstruction values of the pixels 220, 221, 222, 231, and 230. As described with reference to FIG. 2, a determination may be made based on the reconstruction values of the pixels 220, 221, 222, 231, and 230 and pixel values of the pixels 220, 221, 222, 231, and 230. For example, the pixel value of the pixel 220 may be 18, but the reconstruction value of the pixel 220 may be 20. FIG. 3 shows the reconstruction values of the pixels 220, 221, 222, 230, and 231 and the pixel values of the pixels 211, 212, 213, and 214.

In some example embodiments such as FIG. 3, the detecting circuitry 110 may be configured to receive the signal s0 and the data d0. The signal s0 may include information about the pixel values of the pixels 211, 212, 213, and 214. The data d0 may include information about the reconstruction values of the pixels 220, 221, 222, 230, and 231. The detecting circuitry 110 may be configured to select reference pixels of the pixels 211, 212, 213, and 214 from among the pixels 220, 221, 222, 230, and 231, based on the signal s0 and the data d0. The detecting circuitry 110 may be configured to select a reference pixel of the pixels 211 and 213 from among the pixels 220 and 221. That is, the reference pixel of the pixels 211 and 213 may be selected from among pixels having the same color filter (in detail, a blue filter) as the pixels 211 and 213.

In detail, the detecting circuitry 110 may be configured to evaluate determined values based on the pixel value of the pixel 211 and the reconstruction values of the pixels 220 and 221 and may be configured to select a reference pixel of the pixel 211. As an example, the detecting circuitry 110 may be configured to evaluate absolute values of the determined values. Because a determined value 4 (=20−16) based on the pixel value of the pixel 211 and the reconstruction value of the pixel 220 is smaller than a determined value 14 (=30−16) based on the pixel value of the pixel 211 and the reconstruction value of the pixel 221, the pixel 220 may be selected as a reference pixel of the pixel 211. Likewise, because a determined value 4 (=24−20) based on the pixel value of the pixel 213 and the reconstruction value of the pixel 220 is smaller than a determined value 6 (=30−24) based on the pixel value of the pixel 213 and the reconstruction value of the pixel 221, the pixel 220 may be selected as a reference pixel of the pixel 213. In the following descriptions, it is assumed that the pixel 220 is a reference pixel of the pixels 211 and 213. However, some example embodiments of some inventive concepts may not be limited thereto, and a one-to-one correspondence may be established between reference pixels and pixels. For example, in the case where a reference pixel of the pixel 211 is the pixel 220, a reference pixel of the pixel 213 may be a pixel other than the pixel 220.

In some example embodiments such as FIG. 3, the detecting circuitry 110 may be configured to select a reference pixel of the pixels 212 and 214 from among the pixels 222, 230, and 231. For example, the reference pixel of the pixels 212 and 214 may be selected from among pixels having the same color filter (in detail, a green filter) as the pixels 212 and 214. The pixel 231 may be a pixel that is determined as an abnormal pixel. The detecting circuitry 110 may be configured to select a reference pixel from among the remaining pixels 222 and 230 other than the abnormal pixel 231. Accordingly, the detecting circuitry 110 may be configured to select a reference pixel of the pixels 212 and 214, based on reconstruction values of the remaining pixels 222 and 230 and pixel values of the pixels 212 and 214. As in the way to select the pixel 220 as a reference pixel of the pixels 211 and 213, the detecting circuitry 110 may be configured to select the pixel 230 as a reference pixel of the pixels 212 and 214. After the detecting circuitry 110 selects the reference pixels 220 and 230 of the pixels 211, 212, 213, and 214, the detecting circuitry 110 may be configured to determine whether the pixels 211, 212, 213, and 214 are abnormal pixels. In the following descriptions, each of the pixels 220 and 230 may be referred to as a "reference pixel." Also, each of the reconstruction values of the pixels 220 and 230 may be referred to as a "reference pixel value." In the following descriptions, a determined value based on a pixel and a reference pixel means a determined value based on a pixel value of the pixel and a reference pixel value of the reference pixel.

In some example embodiments such as FIG. 3, the detecting circuitry 110 may be configured to evaluate a determined value based on a pixel and a reference pixel with a reference value and may determine whether the pixel is an abnormal pixel. The detecting circuitry 110 may be configured to evaluate an absolute value of a determined value with a reference value. When the determined value exceeds (or is not smaller than) the reference value, the detecting circuitry 110 may be configured to determine that a pixel is an abnormal pixel. When the determined value is smaller than (or not greater than) the reference value, the detecting circuitry 110 may be configured to determine that a pixel is not an abnormal pixel. In the following descriptions, it is assumed that a reference value is 10, but some example embodiments of some inventive concepts may not be limited thereto. For example, in some example embodiments, the reference value may be a value (e.g., 256) that is sufficiently greater than 10. For example, because a determined value 20 (=110−90) between the pixel 212 and the reference pixel 230 is greater than the reference value 10, the detecting circuitry 110 may be configured to determine that the pixel 212 is an abnormal pixel. Because a determined value 4 (=20−16) based on the pixel 211 and the reference pixel 220 is smaller than the reference value 10, the detecting circuitry 110 may be configured to determine that the pixel 211 is not an abnormal pixel. As in the above description, the detecting circuitry 110 may be configured to determine that each of the pixels 213 and 214 is not an abnormal pixel. However, some example embodiments of some inventive concepts may not be limited thereto. For example, a reference value that is used to determine the pixels 211 and 213 including a "B" filter may be different from a reference value that is used to determine the pixels 212 and 214 including a "G" filter.

As described with reference to FIG. 2, a logical value of the signal s2 may be determined based on whether a line pixel includes an abnormal pixel. When a line pixel does not include an abnormal pixel, the detecting circuitry 110 may be configured to output the signal s2 having a value of logic 0. When a line pixel includes an abnormal pixel, the detecting circuitry 110 may be configured to output the signal s2 having a value of logic 1.

Figure 4:
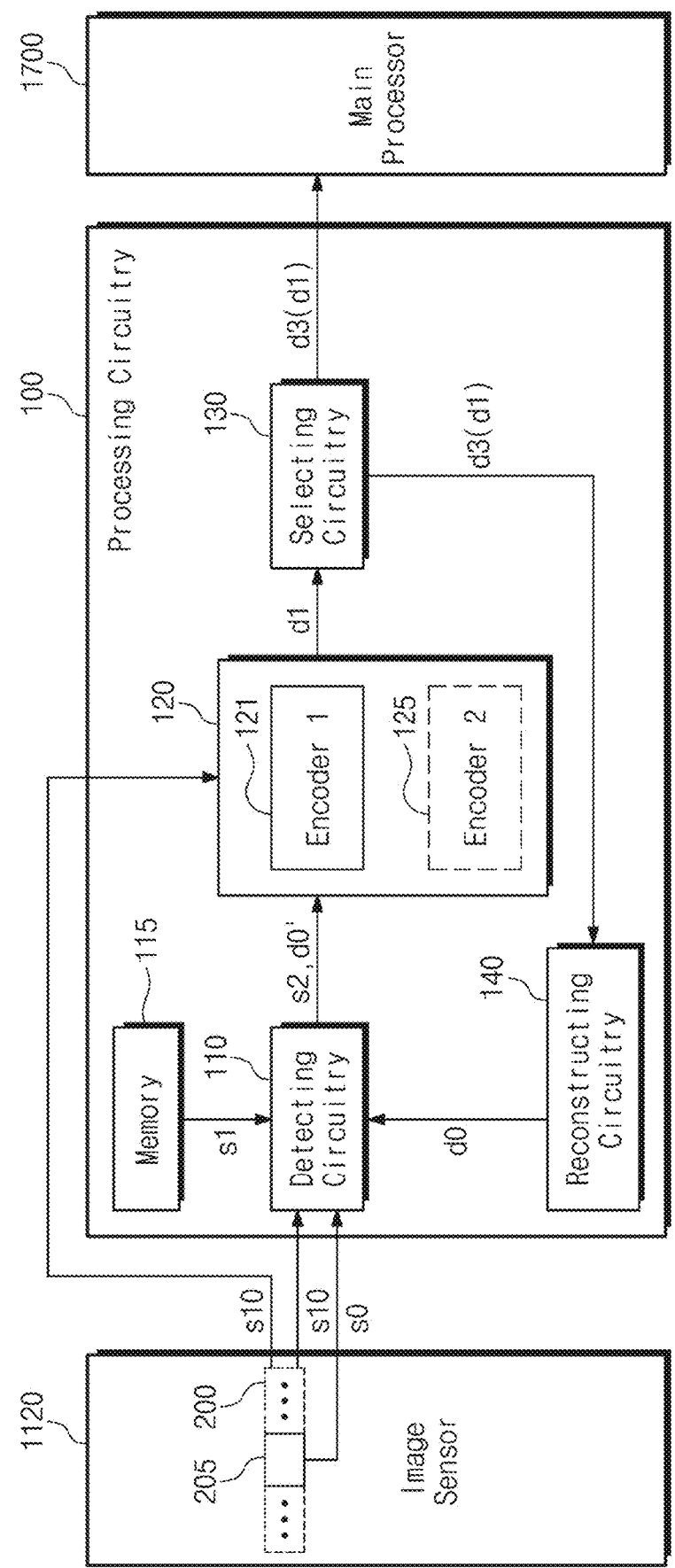
FIG. 4 is a block diagram of an example of an operation of processing circuitry in the case where a line pixel does not include an abnormal pixel according to some example embodiments.

FIG. 4 is a block diagram of an example of processing circuitry in the case where a line pixel does not include an abnormal pixel according to some example embodiments. For better understanding, FIGS. 2 and 3 will be referenced together. The case where the line pixel 200 does not include an abnormal pixel will be described with reference to FIG. 4.

As described with reference to FIG. 2, the detecting circuitry 110 may be configured to receive the signal s10 and the data d0. The detecting circuitry 110 may be configured to detect whether the line pixel 200 includes an abnormal pixel, based on the signal s10 and the data d0. In detail, the detecting circuitry 110 may be configured to use pixel values that the signal s1 indicates and reconstruction values that the data d0 indicates. In a description to be given with reference to FIG. 4, the line pixel 200 may mean the line pixel 202 of FIG. 3. In this case, the signal s10 may indicate pixel values of the pixels 230 and 231, and the data d0 may indicate reconstruction values of the pixels 220, 221, and 222.

In some example embodiments such as FIG. 4, when the line pixel 200 does not include an abnormal pixel, the detecting circuitry 110 may be configured to output the signal s2 having a value of logic 0. In this case, the second encoder 125 may be configured not to operate. That is, the second encoder 125 may be configured not to encode the signal s10. A first encoder 121 may be configured to encode the signal s10 regardless of a logical value of the signal s2. The first encoder 121 may be configured to encode the signal s10 in the first way and/or to output the data d1. The first way will be described with reference to FIG. 7. The first encoder 121 may be configured to output the data d1 to the selecting circuitry 130. The selecting circuitry 130 may be configured to receive the data d1. When only the data d1 are received from the first encoder 121 and the data d2 are not received, the selecting circuitry 130 may be configured to output the data d1. That is, the data d3 may be the data d1.

In some example embodiments such as FIG. 4, the selecting circuitry 130 may be configured to output the data d1 to the main processor 1700 and/or the reconstructing circuitry 140. The reconstructing circuitry 140 may be configured to receive the data d1. As described with reference to FIG. 2, the reconstructing circuitry 140 may be configured to decode the data d1 and/or to obtain reconstruction values of pixels included in the line pixel 200. For example, in the case where the line pixel 200 means the line pixel 202 of FIG. 3, the reconstructing circuitry 140 may be configured to obtain reconstruction values of the pixels 230 and 231. The reconstruction values of the pixels 230 and 231 may be used to determine whether the line pixel 203 includes an abnormal pixel.

Figure 5:
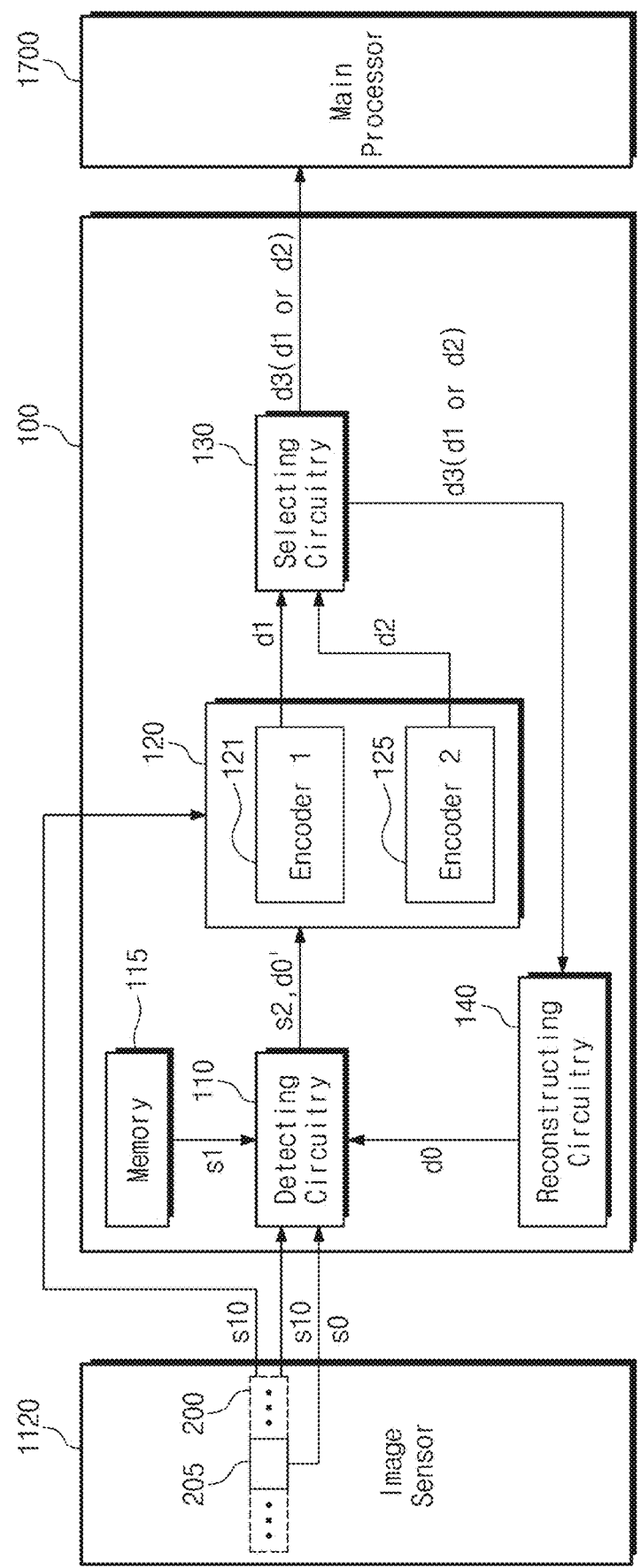
FIG. 5 is a block diagram of an example of an operation of processing circuitry in the case where a line pixel includes an abnormal pixel according to some example embodiments.

FIG. 5 is a block diagram of an example of processing circuitry in the case where a line pixel includes an abnormal pixel according to some example embodiments. For better understanding, FIGS. 2 and 3 will be referenced together. The case where the line pixel 200 includes an abnormal pixel will be described with reference to FIG. 5.

As described with reference to FIG. 2, the detecting circuitry 110 may be configured to receive the signal s10 and the data d0. The detecting circuitry 110 may be configured to detect whether the line pixel 200 includes an abnormal pixel, based on the signal s10 and the data d0. In detail, the detecting circuitry 110 may be configured to use pixel values that the signal s10 indicates and/or reconstruction values that the data d0 indicates. In a description given with reference to FIG. 5, the line pixel 200 may mean the line pixel 203 of FIG. 3. In this case, the signal s10 may indicate pixel values of the pixels 211, 212, 213, and 214, and the data d0 may indicate reconstruction values of the pixels 220, 221, 222, 230, and 231.

In some example embodiments such as FIG. 5, when the line pixel 200 includes an abnormal pixel, the detecting circuitry 110 may be configured to output the signal s2 having a value of logic 1. In this case, the first encoder 121 may be configured to encode the signal s10 in the first way and/or to output the data d1. The first encoder 121 may be configured to output the data d1 to the selecting circuitry 130. The second encoder 125 may be configured to encode the signal s10 in the second way and/or to output the data d2. The second encoder 125 may be configured to output the data d2 to the selecting circuitry 130. The second way will be described with reference to FIG. 8.

In some example embodiments such as FIG. 5, the selecting circuitry 130 may be configured to receive the data d1 and the data d2. When the data d1 and the data d2 are received from the encoder 120, the selecting circuitry 130 may be configured to select one of the data d1 and the data d2. For convenience of description in the present disclosure, a description will be given as the encoder 120 encodes the signal s10 in two encoding ways, but in some example embodiments, the encoder 120 may be configured to encode the signal s10 in two or more encoding ways. Also, the selecting circuitry 130 may be configured to select one of three or more data. As described with reference to FIG. 2, the selecting circuitry 130 may be configured to decode the data d1 in the third way. The selecting circuitry 130 may be configured to evaluate a result of decoding the data d1 with pixel values that the signal s10 indicates. The result of decoding the data d1 may indicate first reconstruction values of the pixels 211, 212, 213, and 214. The selecting circuitry 130 may be configured to obtain information about the pixel values, which the signal s10 indicates, from the image sensor 1120 or from the components such as the detecting circuitry 110, memory 115, and/or encoder 120. The selecting circuitry 130 may be configured to decode the data d2 in the fourth way. The selecting circuitry 130 may be configured to evaluate a result of decoding the data d2 with the pixel values that the signal s10 indicates. The result of decoding the data d2 may indicate second reconstruction values of the pixels 211, 212, 213, and 214.

In some example embodiments such as FIG. 5, the selecting circuitry 130 may be configured to select one of the data d1 and the data d2, based on a result of evaluating the first reconstruction values and the signal S10 and a result of evaluating the second reconstruction values and the signal s10. The selecting circuitry 130 may be configured to select data corresponding to reconstruction values, which are closer to the pixel values that the signal s10 indicates, from among the first reconstruction values and the second reconstruction values. The selecting circuitry 130 may be configured to output the data d3 to the main processor 1700 and/or the reconstructing circuitry 140. The data d3 may be the data d1 or the data d2. An operation of the reconstructing circuitry 140 is similar to the operation described with reference to FIG. 4, and thus, additional description will be omitted to avoid redundancy. However, as described with reference to FIG. 2, the selecting circuitry 130 may be configured to output data, which may indicate reconstruction values corresponding to the data d3, to the reconstructing circuitry 140, instead of the data d3.

Figure 6:
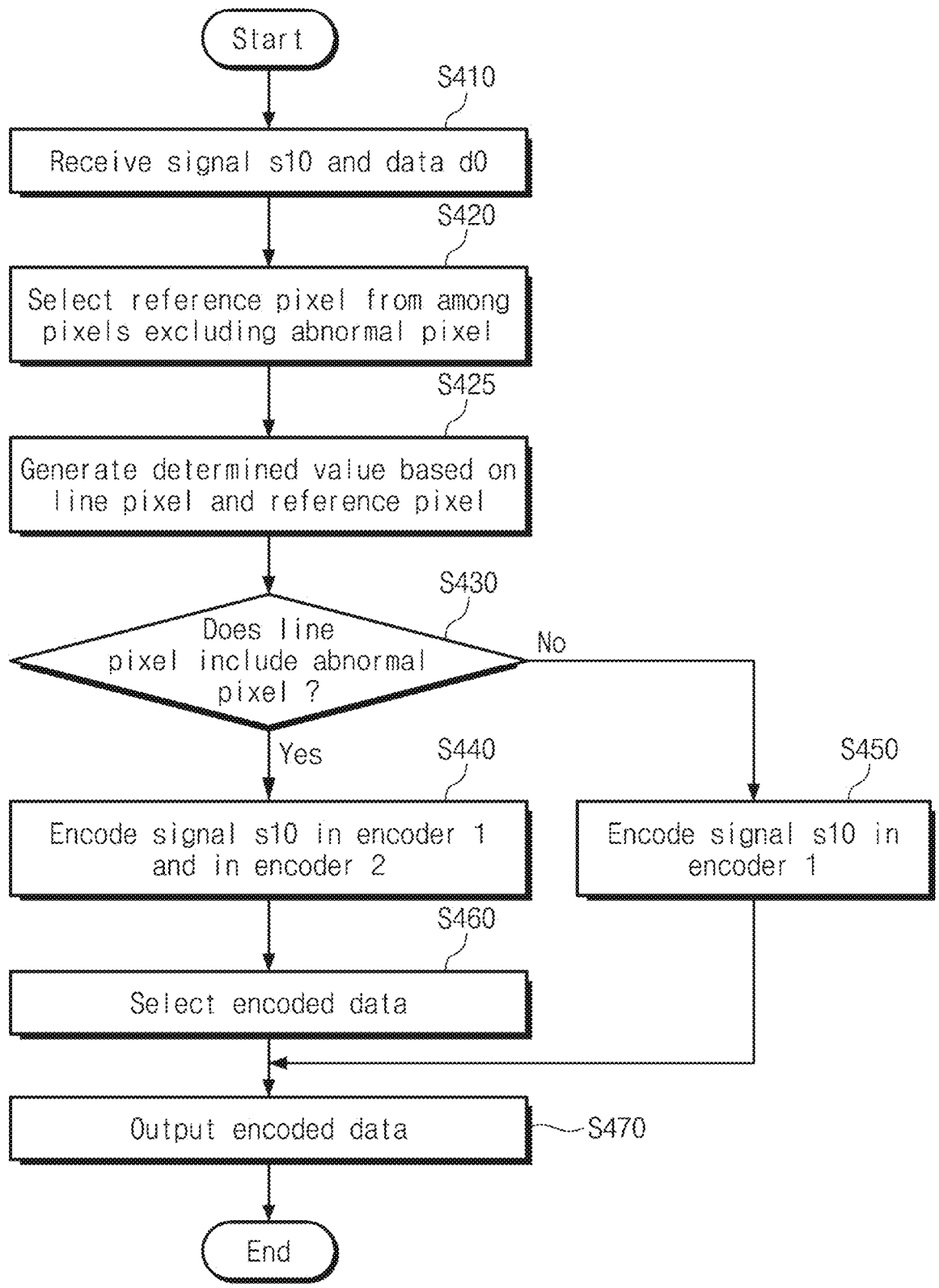
FIG. 6 is a flowchart of an example of an operation of processing circuitry according to some example embodiments.

FIG. 6 is a flowchart of an example of an operation of processing circuitry according to some example embodiments. For better understanding, FIGS. 3 to 5 will be referenced together. In a description to be given with reference to FIGS. 6 to 15, it is assumed that the line pixel 200 of FIG. 5 may mean the line pixel 203 of FIG. 3. Accordingly, it is assumed that the signal s10 indicates pixel values of the pixels 211, 212, 213, and 214. Also, it is assumed that the data d0 indicates reconstruction values of the pixels 220, 221, 222, 230, and 231. Further, in the example of FIG. 6, various operations are described as being performed by some components of processing circuitry according to some example embodiments, such as the example embodiment show in FIG. 2; however, it is to be appreciated that in other example embodiments, such operations may be performed by processing circuitry that is differently organized.

In operation S410, the detecting circuitry 110 may receive the signal s10 and the data d0.

In operation S420, the detecting circuitry 110 may select reference pixels of the pixels 211, 212, 213, and 214 based on the signal s10 and the data d0. The detecting circuitry 110 may determine the pixel 231 as an abnormal pixel in an operation of determining whether the line pixel 202 includes an abnormal pixel. The detecting circuitry 110 may select a reference pixel from among the remaining pixels 220, 221, 222, and 230 other than the abnormal pixel 231. As described with reference to FIG. 3, the detecting circuitry 110 may select the reference pixel 220 of the pixels 211 and 213 based on determined values based on the pixel values of the pixels 211 and 213 and the reconstruction values of the pixels 220 and 221. The detecting circuitry 110 may select the reference pixel 230 of the pixels 212 and 214 based on determined values based on the pixel values of the pixels 212 and 214 and the reconstruction values of the pixels 222 and 230.

In operation S425, the detecting circuitry 110 may detect an abnormal pixel from the pixels 211, 212, 213, and 214 by using the reference pixels 220 and 230 selected above. The detecting circuitry 110 may generate determined values based on the respective pixels 211 and 213 and the reference pixel 220. The detecting circuitry 110 may be configured to generate determined values based on the respective pixels 212 and 214 and the reference pixel 230.

In operation S430, the detecting circuitry 110 may determine whether the line pixel 203 includes an abnormal pixel. The detecting circuitry 110 may be configured to evaluate the determined values generated in operation S425 with a reference value. When a determined value that is not smaller than (or exceeds) the reference value is present in the determined values, the detecting circuitry 110 may determine that the line pixel 203 includes an abnormal pixel. When each of the determined values is smaller than (or not greater than) the reference value, the detecting circuitry 110 may determine that the line pixel 203 does not include an abnormal pixel.

When the line pixel 203 includes an abnormal pixel, in operation S440, the detecting circuitry 110 may output the signal s2 having a value of logic 1. The first encoder 121 and the second encoder 125 may receive the signal s2. The first encoder 121 may generate the data d1 regardless of a logical value of the signal s2. The data d1 may be data that are obtained by encoding the signal s10 in the first way. When the second encoder 125 receives the signal s2 having a value of logic 1, the second encoder 125 may generate the data d2. The data d2 may be data that are obtained by encoding the signal s10 in the second way.

When the line pixel 203 does not include an abnormal pixel, in operation S450, the detecting circuitry 110 may output the signal s2 having a value of logic 0. The first encoder 121 and/or the second encoder 125 may receive the signal s2. The first encoder 121 may generate the data d1 regardless of a logical value of the signal s2. When the second encoder 125 receives the signal s2 having a value of logic 0, the second encoder 125 may not encode the signal s10.

In operation S460, the selecting circuitry 130 may receive the data d1 and the data d2. The selecting circuitry 130 may select one of the data d1 and the data d2. The selecting circuitry 130 may decode the data d1 and the data d2. The selecting circuitry 130 may select data, which are close to pixel values that the signal s10 indicates, from among the data d1 and the data d2, based on decoding results.

In operation S470, the selecting circuitry 130 may output the data d3. When the data d1 and the data d2 are received from the encoder 120, the data d3 may be the data that are selected by the selecting circuitry 130. When the data d1 are received from the encoder 120, the data d3 may be the data d1.

FIG. 7 is a conceptual diagram of an example of a first way in which a first encoder 121 may encode a signal s10 according to some example embodiments. For better understanding, FIGS. 2 and 3 will be referenced together. As shown in FIG. 7, a first encoder 121 may be configured to encode the signal s10 in the first way and/or to output the data d1. The data d1 may be encoded to indicate determined values between the pixels 211, 212, 213, and 214 and the reference pixels 220 and 230. Data 300a and 300b may be only data for describing the first way and may be data that are not generated actually. The data 300a may include data 310a, 211a, 212a, 213a, and 214a. The data 310a may indicate a shift mode of the data 300a. The shift mode will be described below with reference to the data 300b. The data 300a may indicate determined values based on the pixels 211, 212, 213, and 214 and the reference pixels 220 and 230. The determined values may be expressed by a binary value. Four bits may be assigned to each of the data 211a, 212a, 213a, and 214a. In the following descriptions, some example embodiments of some inventive concepts may involve representing a negative number and a positive number through the data 211a, 212a, 213a, and 214a by using the most significant sign bit expression (in detail, 2's complement). Accordingly, each of the data 211a, 212a, 213a, and 214a may express an integer from −8 to 7. However, some example embodiments of some inventive concepts may not be not limited thereto. For example, 1's complement or an absolute value may be used. In the case where the 1's complement or the absolute value is used, each of the data 211a, 212a, 213a, and 214a may represent an integer from −7 to 7. As another example, one or more bits may be assigned to each of the data 211a, 212a, 213a, and 214a. A first bit of each of the data 211a, 212a, 213a, and 214a may indicate whether a determined value is a positive number or a negative number. In the case where a determined value is a positive number, the first bit may indicate 0. In the case where a determined value is a negative number, the first bit may indicate 1.

A determined value −4 (=16−20) based on the pixel 211 and the reference pixel 220 may be an integer between −8 to 7. Accordingly, the data 211a may indicate a determined value of −4. The determined value of −4 may be represented by 1011 as a binary number.

A determined value 4 (=24−20) based on the pixel 213 and the reference pixel 220 may be an integer between −8 to 7. Accordingly, the data 213a may indicate a determined value of 4. The determined value of 4 may be represented by 0100 as a binary number.

A determined value 6 (=96−90) based on the pixel 214 and the reference pixel 230 may be an integer between −8 to 7. Accordingly, the data 214a may indicate a determined value of 6. The determined value of 6 may be represented by "0110" as a binary number.

A determined value 20 (=110−90) based on the pixel 212 and the reference pixel 230 may not be an integer between −8 to 7. The determined value of 20 may be represented by 010100 as a binary number. Because four bits are assigned to the data 212a, the data 212a may fail to represent the determined value of 20.

In the case where a pixel value that the data 300a fails to represent exists, the data 300a may be converted into the data 300b through a shift operation. The shift operation may mean shifting bits included in the data 300a in an upper bit direction or in a lower bit direction. In the following descriptions featuring a big-Endian bit format, a bit shift to the right may mean the lower bit direction, and a bit shift to the left may mean the upper bit direction. In an encoding process, bits of the data 300a may be shifted to the right. However, because the first bits of the data 211a, 212a, 213a, and 214a indicate signs of determined values, the first bits thereof may not be shifted. 0 may be filled at positions (e.g., the second bit of the data 211b) that are empty after bits are shifted to the right. Bits that are positioned on the far right may be lost as bits are shifted to the right. Accordingly, as the number of times the shift operation is performed increases, the amount of the data 300a lost may increase. In the case where the amount of the data 300a lost increases, a determination based on a result of decoding the data 300a and pixel values that the signal s10 indicates may change (e.g., increase).

The data 300b may include data 310b, 211b, 212b, 213b, and 214b. The data 310b, 211b, 212b, 213b, and 214b may be data obtained by converting the data 310a, 211a, 212a, 213a, and 214a, respectively. The data 211b, 213b, and 214b may indicate determined values based on the pixels 211, 213, and 214 and the reference pixels 220 and 230. The data 310b may indicate a shift mode of the data 300b. The shift mode may indicate a process in which the data 310b are encoded, a way in which the data 310b are encoded, etc. In detail, the shift mode may indicate the number of times of shift operations that are performed to generate the data 310b. The number of times of shift operations may be represented by a binary number in the data 310b. The shift mode may be referenced when data are decoded by the selecting circuitry 130 and/or the reconstructing circuitry 140.

The data 310b may indicate 01. 01 may mean that the data 300b are generated by performing the shift operation on the data 300a once.

The data 211b, 213b, or 214b may be generated by performing a shift operation on the data 211a, 213a, or 214a once. The data 211b may indicate 1001. The data 213b may indicate 0010. The data 214b may indicate 0011.

The data 212b may be generated by performing a shift operation on the data 212a once. A determined value 20 (=110−90) based on the pixel 212 and the reference pixel 230 may be represented by 010100 as a binary number. 010100 may be converted into 01010 by performing a shift operation on the data 212a once. Because four bits are assigned to the data 212b, the data 212b may fail to represent 01010.

As in the description given with reference to the data 300a, in the case where a pixel value that the data 300b fails to represent exists, a shift operation may be performed on the data 300b. The data 300b may be converted into the data d1 through a shift operation.

The data d1 may include data 310c, 211c, 212c, 213c, and 214c. The data 310c, 211c, 212c, 213c, and 214c may be data obtained by converting the data 310b, 211b, 212b, 213b, and 214b, respectively. The data 211c, 212c, 213c, and 214c may indicate determined values based on the pixels 211, 212, 213, and 214 and the reference pixels 220 and 230.

The data 310c may indicate 10. 10 may mean that the data d1 are generated by performing the shift operation on the data 300a two times.

The data 211c, 213c, or 214c may be generated by performing a shift operation on the data 211a, 213a, or 214a two times. The data 211c may indicate 1000. The data 213c may indicate 0001. The data 214c may indicate 0001.

The data 212c may be generated by performing a shift operation on the data 212a two times. A determined value 20 (=110−90) based on the pixel 212 and the reference pixel 230 may be represented by 010100 as a binary number. 010100 may be converted into 0101 by performing a shift operation on the data 212a two times. The data 212c may indicate 0101. That is, the data 212c may indicate a determined value of 20.

The first encoder 121 may be configured to generate the data d1 through the way described with reference to FIG. 7. As a determined value based on an abnormal pixel and a reference pixel becomes greater, the number of times a shift operation is performed may increase. As described with reference to FIG. 7, as the number of times a shift operation is performed increases, the amount of information to be lost in the encoding process may increase. In this case, a determination based on a result of decoding the data d1 and pixel values that the signal s10 indicates may increase.

FIG. 8 is a conceptual diagram of an example of a second way in which the second encoder 125 may encode the signal s10 according to some example embodiments. For better understanding, FIGS. 2 and 3 will be referenced together.

In some example embodiments such as FIG. 8, the second encoder 125 may be configured to encode the signal s10 in the second way and may output the data d2. The data d2 may include data 310e, 211e, 212e, 213e, and 214e. The data 310e may indicate a shift mode of the data d2. The data 310e may indicate 00. 00 may mean that a shift operation is not performed on the data d2. Unlike the data 300a, the data d2 may not include data indicating a determined value based on the abnormal pixel 212 and the reference pixel 230. Instead, the data d2 may include data 212e indicating a position of the abnormal pixel 212. However, some example embodiments of some inventive concepts may not be limited thereto. For example, in some example embodiments, the data 212e may mean data associated with the abnormal pixel 212. The data 212e may be referenced when the data d2 are decoded by the selecting circuitry 130 and/or the reconstructing circuitry 140. The selecting circuitry 130 and/or the reconstructing circuitry 140 may be configured to determine that the data d2 are encoded in the second way. A size of the data 212e may be smaller than a size of the data 212a. Accordingly, in the case where the size of the data d1 is the same as the size of the data d2, an available space of the data d2 may be greater than an available space of the data d1.

In some example embodiments such as FIG. 8, the second encoder 125 may be configured to generate the data 211e, 213e, and 214e corresponding to the remaining pixels 211, 213, and 214 other than the abnormal pixel 212 in a way that is similar to the first way. The data 211e, 213e, and 214e may indicate determined values based on the pixels 211, 213, and 214 and the reference pixels 220 and 230. However, unlike the first way, since the second encoder 125 may be configured not to consider the abnormal pixel 212, the second encoder 125 may be configured not to perform a shift operation. Accordingly, the data 211e, 213e, and 214e may be the same as the data 211a, 213a, and 214a, respectively. However, some example embodiments of some inventive concepts may not be limited thereto. For example, the second encoder 125 may be configured to perform a shift operation. The above description in which the second encoder 125 is configured not to perform a shift operation may mean that the number of times a shift operation is performed by the second encoder 125 may be smaller than the number of times a shift operation is performed by the first encoder 121. Accordingly, the amount of information to be lost in the process that the data d2 are generated in the case where the line pixel 200 includes an abnormal pixel may be smaller than the amount of information to be lost in the process that the data d2 are generated in the case where the line pixel 200 doesn't include an abnormal pixel. Accordingly, the data d2 may indicate information about the line pixel 200 more exactly than the data d1.

Figure 9:
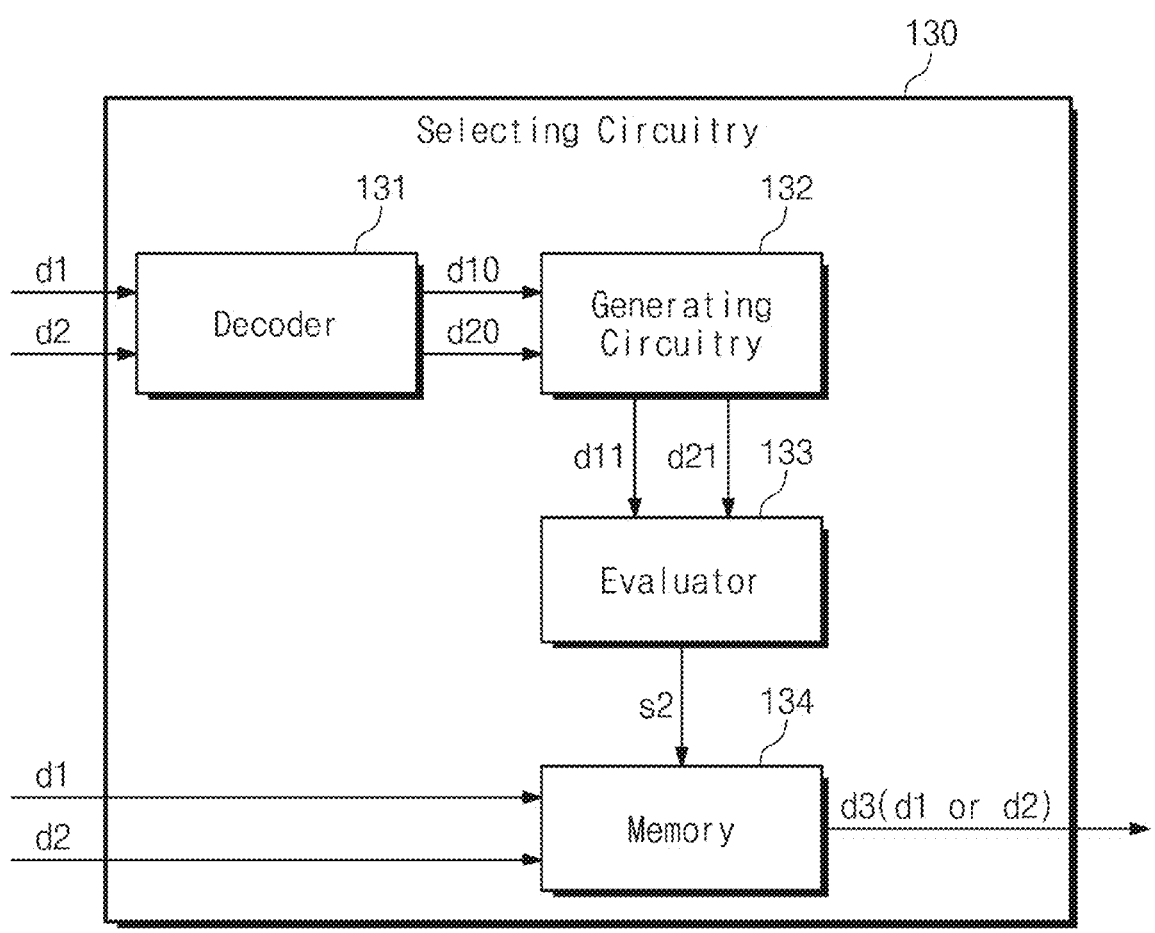
FIG. 9 is a block diagram of an example of selecting circuitry of FIG. 2 according to some example embodiments.

FIG. 9 is a block diagram of an example of selecting circuitry of FIG. 2 according to some example embodiments. For better understanding, FIGS. 2 and 3 will be referenced together. In some example embodiments such as the example of FIG. 9, the selecting circuitry 130 may include a decoder 131, a generating circuitry 132, an evaluator 133, and a memory 134. The decoder 131 may be configured to receive the data d1 and the data d2. The decoder 131 may be configured to decode the data d1, which are encoded in the first way, in a third way. The decoder 131 may be configured to decode the data d1 and/or to generate data d10. The data d10 may indicate first reconstruction values of the pixels 211, 212, 213, and 214. Since information may be lost in the process of encoding and decoding the signal s10, a determination may be made based on the first reconstruction values of the pixels 211, 212, 213, and 214 and pixel values of the pixels 211, 212, 213, and 214. The third way will be described with reference to FIGS. 10 and 11.

In some example embodiments such as FIG. 9, the decoder 131 may be configured to decode the data d2, which are encoded in the second way, in a fourth way. The decoder 131 may be configured to decode the data d2 and may generate data d20. The data d20 may indicate second reconstruction values of the pixels 211, 212, 213, and 214. Since information is lost in the process of encoding and decoding the signal s10, a determination may be made between the second reconstruction values of the pixels 211, 212, 213, and 214 and pixel values of the pixels 211, 212, 213, and 214. The fourth way will be described with reference to FIGS. 12 and 13. The decoder 131 may be configured to output the data d10 and the data d20. However, some example embodiments of some inventive concepts may not be limited thereto. For example, the selecting circuitry 130 may be configured to include a plurality of decoders. Each of the plurality of decoders may be configured to decode the data d1 and the data d2.

In some example embodiments such as FIG. 9, the generating circuitry 132 may be configured to receive the data d10 and the data d20. The generating circuitry 132 may be configured to generate first determined values based on the first reconstruction values of the pixels 211, 212, 213, and 214 and the pixel values of the pixels 211, 212, 213, and 214 by using the data d10. The generating circuitry 132 may output data d11 based on a generated result. The data d11 may indicate first determined values. The generating circuitry 132 may be configured to generate second determined values between the second reconstruction values of the pixels 211, 212, 213, and 214 and the pixel values of the pixels 211, 212, 213, and 214 by using the data d20. The generating circuitry 132 may be configured to output data d21 based on a generated result. The data d21 may indicate second determined values.

In some example embodiments such as FIG. 9, the evaluator 133 may be configured to receive the data d11 and the data d21. The evaluator 133 may be configured to evaluate the first determined values and the second determined values by using the data d11 and d21. As one example, the evaluator 133 may be configured to evaluate a sum of the first determined values and/or a sum of the second determined values. However, some example embodiments of some inventive concepts may not be limited thereto. For example, in some example embodiments, the evaluator 133 may be configured to evaluate the first determined values and the second determined values in various manners. The evaluator 133 may determine a logical value of the signal s2 based on an evaluation result. For example, when the sum of the first determined values is smaller than (or not greater than) the sum of the second determined values, the evaluator 133 may output the signal s2 having a value of logic 0. When the sum of the first determined values is not smaller than (or exceeds) the sum of the second determined values, the evaluator 133 may output the signal s2 having a value of logic 1.

In some example embodiments such as FIG. 9, the memory 134 may be configured to receive the signal s2. The memory 134 may be configured to store the data d1 and the data d2. The memory 134 may be configured to output one of the data d1 and the data d2 based on a logical value of the signal s2. For example, when the signal s2 having a value of logic 0 is received, the memory 134 may be configured to output the data d1. When the signal s2 having a value of logic 1 is received, the memory 134 may be configured to output the data d2.

Figure 10:
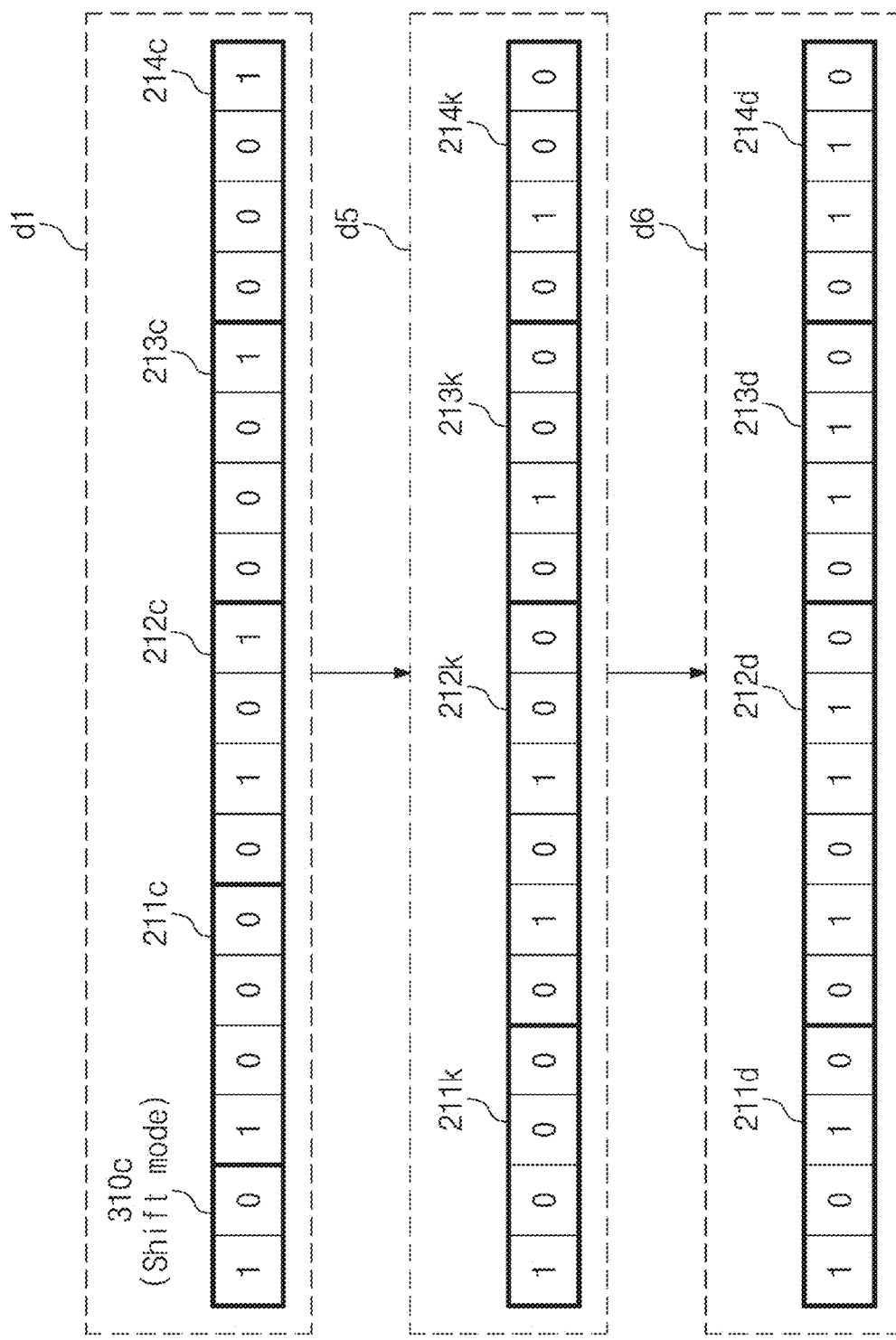
FIG. 10 is a conceptual diagram of an example of a third way in which a decoder of FIG. 9 may decode a signal according to some example embodiments.
Figure 11:
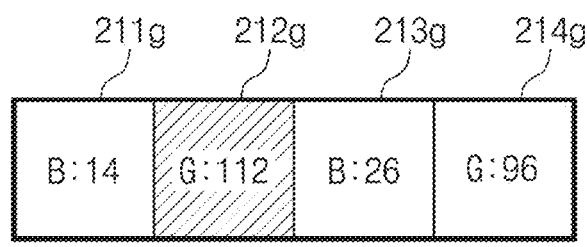
FIG. 11 is a conceptual diagram of an example of first reconstruction values according to some example embodiments.

FIG. 10 is a conceptual diagram of an example of a third way in which a decoder of FIG. 9 may decode a signal according to some example embodiments. FIG. 11 is a conceptual diagram of an example of first reconstruction values according to some example embodiments. For better understanding, FIGS. 10 and 11 will be referenced together.

In some example embodiments such as FIG. 10, the decoder 131 may be configured to receive the data d1. In the case where the data d1 do not include the data 212e indicating a position of an abnormal pixel, the decoder 131 may be configured to determine the data d1 is encoded in the first way. Accordingly, the decoder 131 may be configured to decode the data d1 in the third way. The decoder 131 may be configured to refer to the data 310c for the purpose of decoding the data d1. The decoder 131 may be configured to determine that the data d1 are encoded through two shift operations, based on the data 310c. The decoder 131 may be configured to perform a shift operation on the data d1 two times. Unlike the first encoder 121, the decoder 131 may be configured to shift bits of the data d1 to the left. The decoder 131 may be configured to shift the bits of the data d1 to the left two times. As in the above case that a shift operation is performed on the data 300a, the first bits of the data 211c, 212c, 213c, and 214c may indicate signs of determined values and thus may not be shifted.

In some example embodiments such as FIG. 10, bits (e.g., the second and third bits of the data 211c) positioned on the left may be lost as bits are shifted to the left. 0 may be filled at positions that are empty as bits are shifted to the left. Data d5 may be generated by performing a shift operation on the data d1 two times. However, in the case where correction is not made with regard to the data d5, due to the loss occurring in the decoding and encoding process, a significantly great determination may be made based on pixel values, which the data d5 indicate, and pixel values of the pixels 211, 212, 213, and 214. Accordingly, the decoder 131 may be configured to correct the data d5 and/or to generate data d6. The decoder 131 may be configured to fill 1 at positions corresponding to the second bits of the data 211d, 212d, 213d, and 214d with respect to the right. However, some example embodiments of some inventive concepts may not be limited thereto. For example, in some example embodiments, the decoder 131 may be configured to correct the data d5 in a different manner. For example, the decoder 131 may be configured to fill 1 at positions corresponding to the rightmost bits of the data 211d, 212d, 213d, and 214d.

In some example embodiments such as FIG. 10, the data d6 may include data 211d, 212d, 213d, and 214d. The data 211d, 212d, 213d, and 214d may indicate values that are obtained by reconstructing determined values between the pixels 211, 212, 213, and 214 and the reference pixels 220 and 230. The data 211d, 212d, 213d, and 214d may indicate −6, 22, 6, and 6, respectively. The memory 134 may be configured to store information about reference pixel values of the reference pixels 220 and 230. The reference pixel values of the reference pixels 220 and 230 may be 20 and 90, respectively. The decoder 131 may be configured to generate the data d10 based on the data d6 and the information about the reference pixel values stored in the memory 134. The data d10 may indicate first reconstruction values of the pixels 211, 212, 213, and 214. The first reconstruction values may be values that are obtained by adding the reconstructed determined values and the reference pixel values. The first reconstruction values of the pixels 211, 212, 213, and 214 are marked on the pixels 211g, 212g, 213g, and 214g as illustrated in FIG. 11. The reconstruction values of the pixels 211, 212, 213, and 214 may be 14, 112, 26, and 96, respectively.

Figure 12:
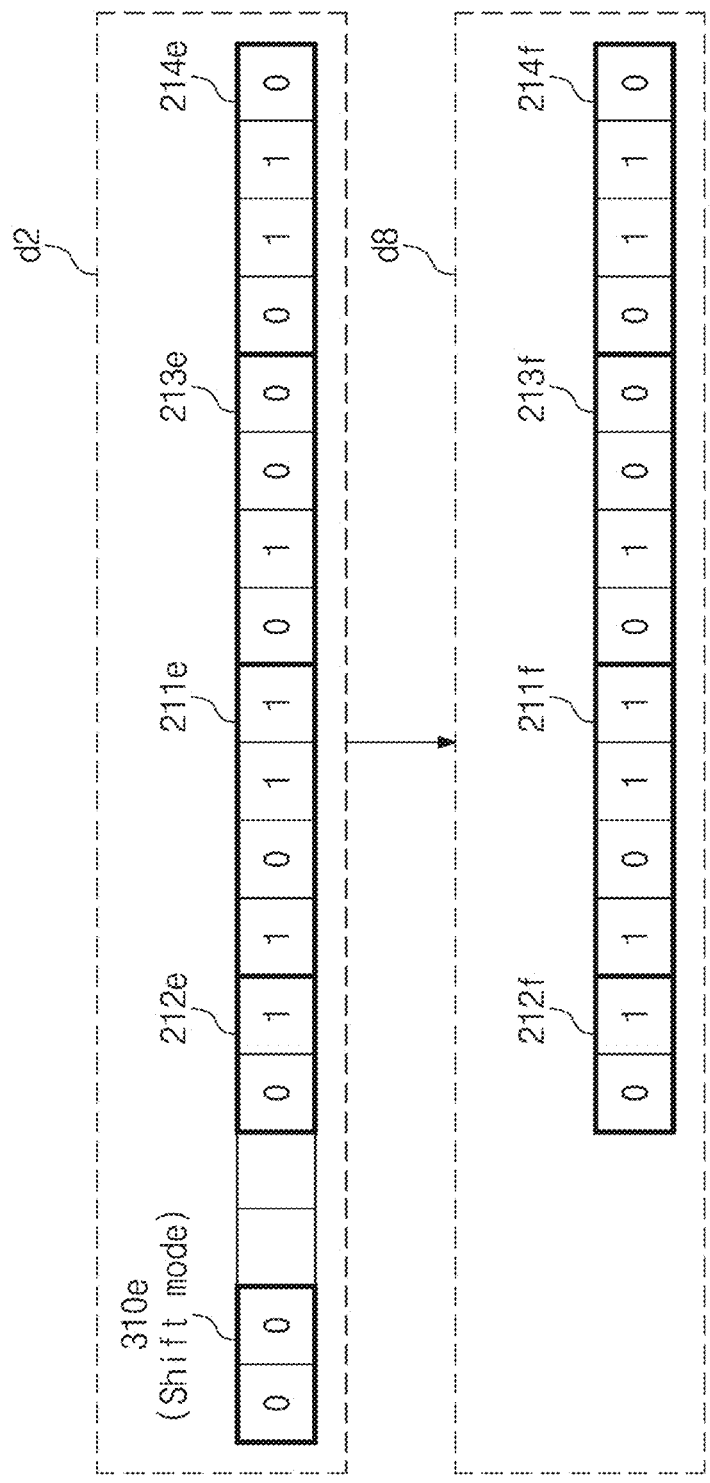
FIG. 12 is a conceptual diagram of an example of a fourth way that a decoder of FIG. 9 may be configured to decode a signal according to some example embodiments.

FIG. 12 is a conceptual diagram of an example of a fourth way that a decoder of FIG. 9 may be configured to use to decode a signal according to some example embodiments. FIG. 13 is a conceptual diagram of an example of second reconstruction values according to some example embodiments. For better understanding, FIGS. 12 and 13 will be referenced together. As shown in FIG. 12, the decoder 131 may be configured to receive the data d2. The decoder 131 may be configured to refer to the data 310e for the purpose of decoding the data d2. The decoder 131 may be configured to determine that the data d1 are encoded in the second way, based on the data 212e. Accordingly, the decoder 131 may be configured to decode the data d2 in the fourth way. The decoder 131 may be configured to refer to the data 310e for the purpose of decoding the data d2. The decoder 131 may be configured to determine that a shift operation is not performed on the data d2, based on the data 310e. A way to decode the data 211e, 213e, and 214e may be substantially the same as the way described with reference to FIG. 10. Because a shift operation is not performed on the data 211e, 213e, and 214e, bits of the data 211e, 213e, and 214e may not be shifted to the left.

In some example embodiments such as FIG. 12, data d8 may include data 211f, 213f, and 214f. The data 211f, 213f, and 214f may indicate values that are obtained by reconstructing determined values based on the pixels 211, 213, and 214 and the reference pixels 220 and 230. The data 211f, 213f, and 214f may indicate −4, 4, and 6, respectively. The memory 134 may be configured to store information about reference pixel values of the reference pixels 220 and 230. The reference pixel values of the reference pixels 220 and 230 may be 20 and 90, respectively. The decoder 131 may be configured to generate the data d20 based on the data d8 and the information about the reference pixel values stored in the memory 134. The data d20 may indicate second reconstruction values of the pixels 211, 212, 213, and 214. The second reconstruction values of the pixels 211, 213, and 214 may be values that are obtained by adding the reconstructed determined values and the reference pixel values. In the case where the decoder 131 generates the data d20 by using the third way, a second reconstruction value of the pixel 212 may be a value of 100 (=90+10) that is obtained by adding a reference pixel value of the reference pixel 230 and a reference value. However, some example embodiments of some inventive concepts may not be limited thereto. For example, in some example embodiments, the second reconstruction value of the pixel 212 may be a value that is obtained by processing the reference pixel value of the reference pixel 230 and the reference value in various ways. The second reconstruction values of the pixels 211, 212, 213, and 214 are marked on the pixels 211h, 212h, 213h, and 214h illustrated in FIG. 13. The second reconstruction values of the pixels 211, 212, 213, and 214 may be 16, 100, 24, and 96, respectively.

In some example embodiments such as FIGS. 11 and 13, in evaluation of the first reconstruction values (14, 26, 96) of the pixels 211, 213, and 214 marked in FIG. 11 and the second reconstruction values (6, 24, 96) of the pixels 211, 213, and 214 marked in FIG. 13, it may be understood that the second reconstruction values may be closer to the pixel values (16, 24, 96) of the pixels 211, 213, and 214. That is, in the case where the line pixel 200 includes an abnormal pixel, the encoder 120 may be configured to perform encoding such that the loss of information may be reduced or minimized. Accordingly, the data d2 may include more accurate information. Also, because a size of the data 212e is smaller than a size of the data 212c, the efficiency of compression for the signal s10 may be improved. However, the event that the first reconstruction values are closer to the pixel values of the pixels 211, 213, and 214 may occur depending on a pixel value of an abnormal pixel, a reference value, etc. By considering this event, some example embodiments of some inventive concepts may be configured to output data, which may include more accurate information, from among the data d1 and the data d2 by using the generating circuitry 132 and the evaluator 133.

Figure 14:
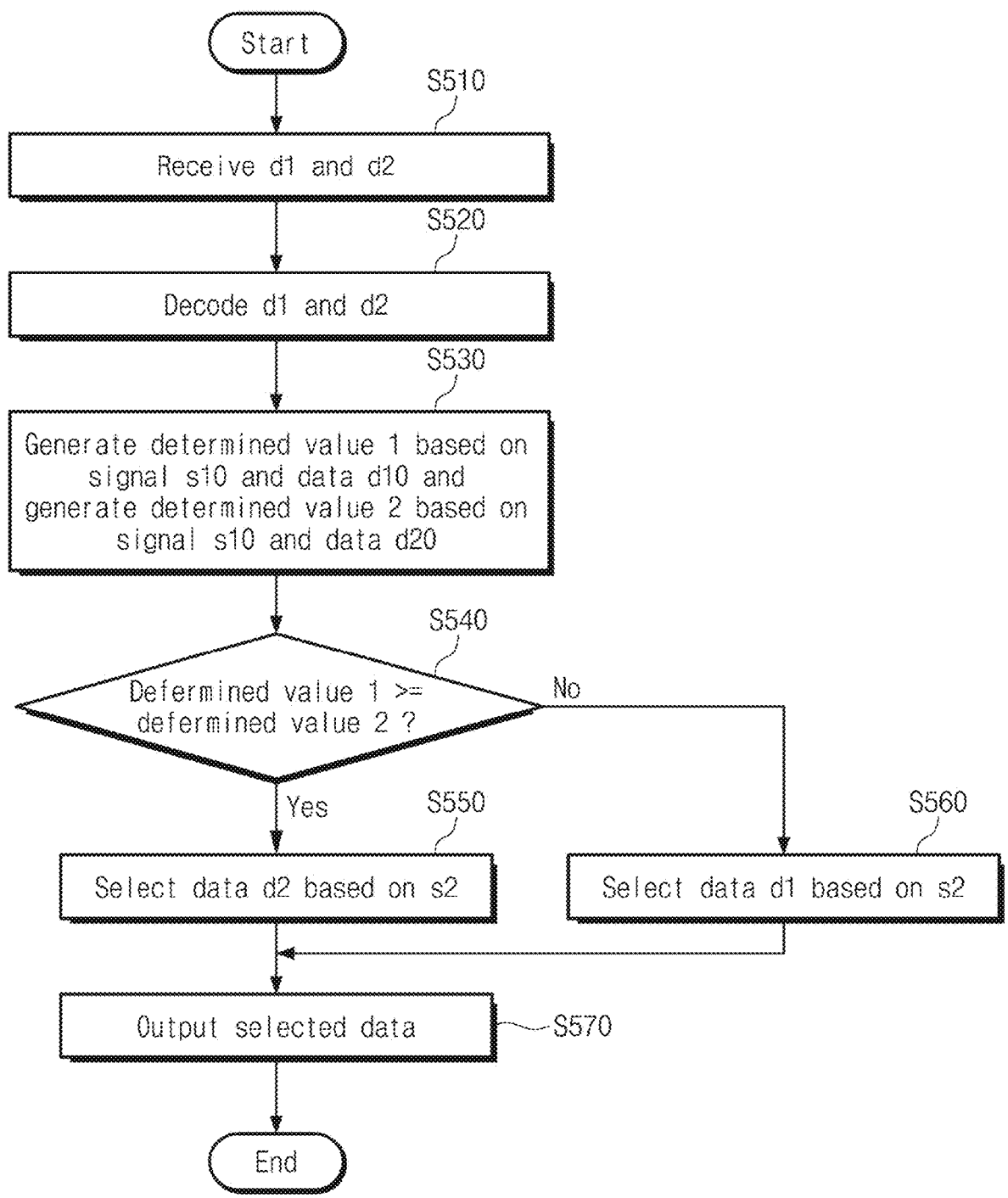
FIG. 14 is a flowchart of an example of an operation of selecting circuitry of FIG. 9 according to some example embodiments.

FIG. 14 is a flowchart for describing an operation of a selecting circuitry of FIG. 9 according to some example embodiments. For better understanding, FIG. 9 will be referenced together. The case where values associated with the abnormal pixel 212 are not considered when the selecting circuitry 130 selects the data d1 and the data d2. Further, in the example of FIG. 14, various operations are described as being performed by some components of processing circuitry according to some example embodiments, such as the example embodiment show in FIG. 2; however, it is to be appreciated that in other example embodiments, such operations may be performed by processing circuitry that is differently organized.

In operation S510, the selecting circuitry 130 may receive the data d1 and the data d2.

In operation S520, the decoder 131 may decode the data d1 and the data d2. As described with reference to FIGS. 10 and 12, the selecting circuitry 130 may decode the data d1 and the data d2, based on the ways to encode the data d1 and the data d2. The selecting circuitry 130 may decode the data d1 and may generate data d10. The data d10 may indicate first reconstruction values. The selecting circuitry 130 may decode the data d2 and may generate data d20. The data d20 may indicate second reconstruction values.

In operation S530, the generating circuitry 132 may receive the data d10 and the data d20. The generating circuitry 132 may generate first determined values based on the first reconstruction values of the pixels 211, 213, and 214 and the pixel values of the pixels 211, 213, and 214. The generating circuitry 132 may generate second determined values based on the second reconstruction values of the pixels 211, 213, and 214 and the pixel values of the pixels 211, 213, and 214.

In operation S540, the evaluator 133 may evaluate the first determined values and the second determined values. The evaluator 133 may determine a logical value of the signal s2 based on an evaluation result. A first determined value based on a pixel value of the abnormal pixel 212 and a first reconstruction value of the abnormal pixel 212 may not be considered. A second determined value based on a pixel value of the abnormal pixel 212 and a second reconstruction value of the abnormal pixel 212 may not be considered. Accordingly, the selecting circuitry 130 may focus on the remaining pixels 211, 213, and 214 a little more. That is, the selecting circuitry 130 may select data that indicate the pixel values of the pixels 211, 213, and 214 more accurately.

When the first determined values are not smaller than the second determined values, in operation S550, the selecting circuitry 130 may select the data d2 based on the signal s2.

When the first determined values are smaller than the second determined values, in operation S560, the selecting circuitry 130 may select the data d1 based on the signal s2.

In operation S570, the selecting circuitry 130 may output the data selected through operation S540 to operation S560.

Figure 15:
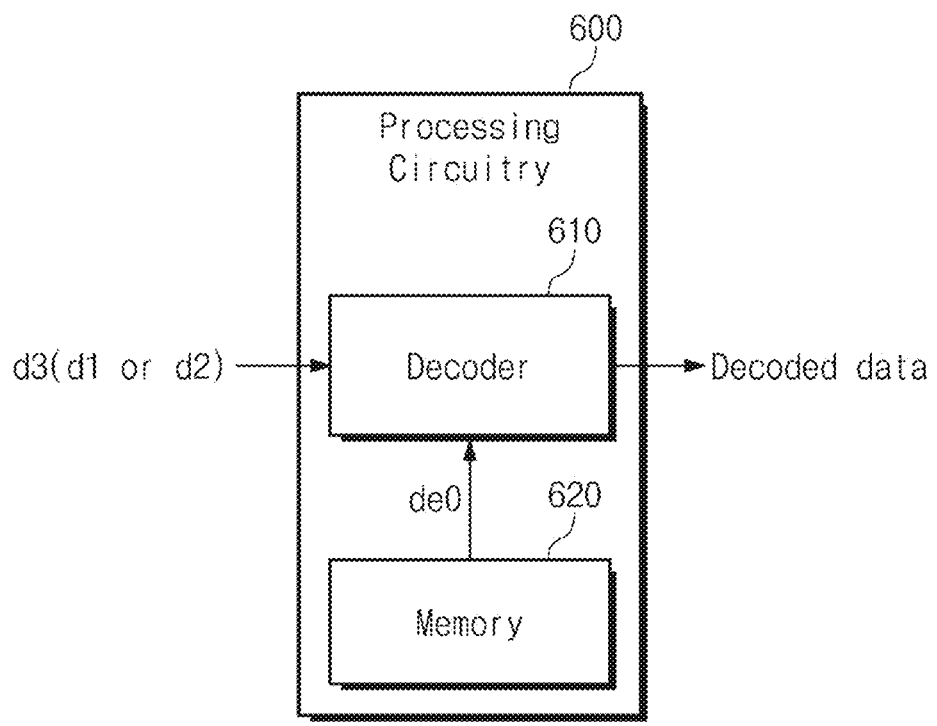
FIG. 15 is a block diagram illustrating processing circuitry including a decoder according to some example embodiments.

FIG. 15 is a block diagram illustrating processing circuitry including a decoder according to some example embodiments.

In some example embodiments such as FIG. 15, processing circuitry 600 may include a decoder 610 and a memory 620. The processing circuitry 600 may be positioned in the display driver circuit 1800. The processing circuitry 600 may be configured to decode the data d3 that are output from the image signal processor 1130 and/or the main processor 1700. An image may be displayed in the display panel 1850, based on the data decoded by the processing circuitry 600.

In some example embodiments such as FIG. 15, the decoder 610 may be associated with the encoder 120. The decoder 610 may be configured to encode the data d3 with reference to a way for the encoder 120 to encode the signal s10. The memory 620 may be configured to store information about reference pixel values of the reference pixels 220 and 230. The memory 620 may be configured to output data de0 to the decoder 610. The decoder 610 may be configured to decode the data d3 based on the data de0. The decoder 610 may be configured to provide operations that are substantially the same as the operations of the decoder 131 of FIG. 9 and/or the reconstructing circuitry 140 of FIG. 2. However, in some example embodiments, a decoder 131 may be configured to decode both the data d1 and the data d2, while in other example embodiments, a decoder 610 may be configured to decode only the data d3. Below, the descriptions given above are omitted to avoid redundancy.

According to some example embodiments, processing circuitry may be configured to encode data in consideration of whether data include abnormal information. A compression ratio for data may be improved through encoding ways according to some example embodiments of some inventive concepts. Also, encoded and decoded data may include more accurate information. Accordingly, image distortion and image degradation occurring in a display panel may be reduced.

While some inventive concepts have been described with reference to some example embodiments thereof, it will be apparent to those of ordinary skill in the art that various changes and modifications may be made thereto without departing from the spirit and scope of some example embodiments of some inventive concepts as set forth in the following claims.

What is claimed is:
1. An image processing block comprising:
an image sensor including a plurality of pixels configured to receive a light from outside, the image sensor configured to generate pixel values of the plurality of pixels based on the received light; and
a processor configured to:

identify an abnormal pixel among the plurality of pixels based on the pixel values;
generate at least one of a first encoded data or a second encoded data by encoding pixel data of the plurality of pixels based on remaining pixels of the plurality of pixels excluding the identified abnormal pixel; and
output a third encoded data based on the at least one first encoded data or the second encoded data.

2. The image processing block of claim 1, wherein the processor is configured to identify the abnormal pixel based on the pixel values and pixel values of one or more reference pixels.

3. The image processing block of claim 2, wherein the abnormal pixel corresponds to a first reference pixel of the one or more reference pixels, and
wherein a determined value based on a pixel value of the abnormal pixel and a pixel value of the first reference pixels is not smaller than a reference value.

4. The image processing block of claim 2, wherein the processor is configured to encode the pixel data based on a determined value based on pixel values of the remaining pixels and a pixel value of a first reference pixel of the one or more reference pixels, and
wherein the first reference pixel is for the remaining pixels.

5. The image processing block of claim 1, wherein the processor is configured to:
decode the at least the first encoded data or the second encoded data to obtain reconstruction values of the pixel values; and
output the third encoded data based on the pixel values and the reconstruction values.

6. The image processing block of claim 1, wherein the processor is configured to:
decode the at least the first encoded data or the second encoded data to obtain reconstruction values for the remaining pixels; and
output the third encoded data based on the pixel values of the remaining pixels and the reconstruction values.

7. The image processing block of claim 1, wherein the processor is further configured to identify the abnormal pixel among the plurality of pixels based on information about an abnormal pixel stored in a memory.

8. An image processing block comprising:
an image sensor including a plurality of pixels configured to receive a light from outside, the image sensor configured to generate pixel values of the plurality of pixels based on the received light; and
a processor, and
in response to a first determined value based on a first pixel value of a first pixel of a first plurality of pixels and a first reference pixel value of a first reference pixel corresponding to the first pixel being greater than a reference value, the processor is configured to:
encode first pixel data for the first plurality of pixels in a first way to generate first encoded data including first data associated with the first pixel,
encode the first pixel data in a second way that is different than the first way to generate second encoded data that does not include the first data; and
select one encoded data of the first encoded data and the second encoded data based on pixel values of the first plurality of pixels, based on the first determined value being greater than the reference value.

9. The image processing block of claim 8, wherein the processor is further configured to generate the second encoded data including second data associated with the first pixel, and
wherein a size of the second data is smaller than a size of the first data.

10. The image processing block of claim 9, wherein the second data includes data that indicates a position of the first pixel.

11. The image processing block of claim 8, wherein the first data includes data that is associated with the first pixel value of the first pixel.

12. The image processing block of claim 8, wherein, the processor is further configured to generate the first encoded data and to refrain from generating the second encoded data in response to the first determined value being smaller than the reference value.

13. The image processing block of claim 8, wherein the processor is further configured to:
receive second pixel data from a second plurality of pixels after the first pixel data are received; and
encode the second pixel data based on reconstruction values that are generated by decoding the selected encoded data.

14. The image processing block of claim 13, wherein the processor is further configured to:
select a second reference pixel value from the reconstruction values based on a difference between second pixel values of the second plurality of pixels and the reconstruction values; and
encode the second pixel data in the first way and the second way in response to a second determined value based on a second pixel value of a second pixel of the second plurality of pixels and the second reference pixel value corresponding to the second pixel being greater than the reference value.

15. The image processing block of claim 13, wherein the processor is further configured to
decode the selected encoded data to generate the reconstruction values corresponding to the first plurality of pixels in response to the selected encoded data including the second encoded data,
wherein a reconstruction value corresponding to the first pixel from among the reconstruction values is based on the first reference pixel value and the reference value.

16. The image processing block of claim 15, wherein the reconstruction value corresponding to the first pixel is a value that is obtained by subtracting the reference value from the first reference pixel value or by adding the reference value and the first reference pixel value.

17. An operating method of an image processing block including an image sensor including a plurality of pixels and a processor, the method comprising:
generating, by the image sensor, pixel values of the plurality of pixels based on light received from outside;
identifying, by the processor, an abnormal pixel among the plurality of pixels based on the pixel values;
generating, by the processor, at least one of a first encoded data or a second encoded data by encoding pixel data of the plurality of pixels based on remaining pixels of the plurality of pixels excluding the identified abnormal pixel; and
outputting, by the processor, a third encoded data based on the at least first encoded data or the second encoded data.

18. The method of claim 17, wherein the identifying, by the processor, an abnormal pixel among the plurality of pixels based on the pixel values comprises identifying the abnormal pixel based on the pixel values and pixel values of one or more reference pixels.

19. The method of claim 18, wherein the abnormal pixel corresponds to a first reference pixel of the one or more reference pixels, and wherein a determined value based on a pixel value of the abnormal pixel and a pixel value of the first reference pixels is not smaller than a reference value.

20. The method of claim 18, wherein the generating, by the processor, the at least first encoded data or the second encoded data by encoding pixel data of the plurality of pixels based on remaining pixels of the plurality of pixels excluding the identified abnormal pixel comprises encoding the pixel data based on a determined value based on pixel values of the remaining pixels and a pixel value of a first reference pixel of the one or more reference pixels, and wherein the first reference pixel is for the remaining pixels.

* * * * *